United States Patent
Yamada et al.

(10) Patent No.: US 7,203,762 B2
(45) Date of Patent: Apr. 10, 2007

(54) COMMUNICATIONS SYSTEM, AND SENDING DEVICE, IN A COMMUNICATION NETWORK OFFERING BOTH LAYER-2 AND LAYER-3 VIRTUAL PRIVATE NETWORK SERVICES

(75) Inventors: Hiroshi Yamada, Fukuoka (JP);
Yoshiaki Horinouchi, Fukuoka (JP);
Ryoji Nakamatsu, Fukuoka (JP);
Kenichi Ishii, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 655 days.

(21) Appl. No.: 10/200,785

(22) Filed: Jul. 22, 2002

(65) Prior Publication Data
US 2003/0131131 A1 Jul. 10, 2003

(30) Foreign Application Priority Data
Jan. 10, 2002 (JP) .............................. 2002-002905

(51) Int. Cl.
*G06F 15/173* (2006.01)
(52) U.S. Cl. ..................... 709/238; 709/236; 709/242; 709/239; 709/249; 370/351
(58) Field of Classification Search ..................... None
See application file for complete search history.

(56) References Cited

U.S. PATENT DOCUMENTS

| | | | | |
|---|---|---|---|---|
| 6,205,488 | B1* | 3/2001 | Casey et al. | 709/238 |
| 6,816,489 | B1* | 11/2004 | Patra et al. | 370/390 |
| 7,072,346 | B2* | 7/2006 | Hama | 370/395.53 |
| 2001/0016914 | A1* | 8/2001 | Tabata | 713/201 |
| 2001/0049739 | A1* | 12/2001 | Wakayama et al. | 709/230 |
| 2002/0037010 | A1* | 3/2002 | Yamauchi | 370/395.53 |
| 2002/0067725 | A1* | 6/2002 | Oguchi et al. | 370/390 |
| 2002/0129271 | A1* | 9/2002 | Stanaway et al. | 713/201 |
| 2002/0156828 | A1* | 10/2002 | Ishizaki et al. | 709/201 |
| 2003/0026271 | A1* | 2/2003 | Erb et al. | 370/401 |
| 2003/0123446 | A1* | 7/2003 | Muirhead et al. | 370/392 |

FOREIGN PATENT DOCUMENTS

JP 2000-341327 12/2000

OTHER PUBLICATIONS

U.S. Appl. No. 10/116,931, filed Apr. 5, 2002, Kubota et al.
Japanese Office Action dated Jul. 18, 2006.

(Continued)

*Primary Examiner*—Bunjob Jaroenchonwant
*Assistant Examiner*—Dohm Chankong
(74) *Attorney, Agent, or Firm*—Katten Muchin Rosenman LLP

(57) ABSTRACT

A communications system in which both a layer-2 and layer-3 virtual private networks (VPNS) can operate in an efficient and cost-effective way to offer improved network services. An ingress edge node has a path data manager which sets and manages path data describing configuration of an intra-network transport path. For transport over the intra-network transport path, a labeling unit adds an intra-network transport label to each outgoing frame, based on the path data. Those frames also have a VPN label for transport over an end-to-end VPN path. In an egress edge node, a frame discrimination value setting unit gives a frame discrimination value for identifying to which VPN each received frame belongs. A redirection processor redirects the received frames to their destinations according to their VPN labels and frame discrimination value.

12 Claims, 28 Drawing Sheets

OTHER PUBLICATIONS

Masaaki Yoneda "Cisco proposes Ether over IP while NTT com adpots EoMPLS, Three methods appear as next generation wide-area LAN technologies" Nikkei Communications, Jul. 2, 2001, vol. 345, pp. 88-89.

Masaaki Yoneda "IP-VPN back bone "MPLS" Reduce network cost for telecommunication companies, Applicable for wide-area Ether and FTTH" Nikkei Communications, Aug. 6, 2001, vol. 347, pp. 130-137.

* cited by examiner

T4 TE MANAGEMENT TABLE

| L2 LABEL FOR TRANSMISSION | VPN-SIDE PHYSICAL PORT | VPN-SIDE LOGICAL PORT | LAYER |
|---|---|---|---|
| 201 | P1 | L2-1 | LAYER 2 |
| 301 | P2 | L3-1 | LAYER 3 |

T5 LAYER-2 FLOW CONDITION TABLE

| VPN-ID | LOGICAL SENDING PORT | LAYER-2 SOURCE ADDRESS | LAYER-2 DESTINATION ADDRESS | TE FUNCTION FLAG | TE PATTERN | VIRTUAL SENDING PORT |
|---|---|---|---|---|---|---|
| 10 | L2-10 | 00:aa:bb:01:01:01 | 00:aa:bb:01:02:01 | OFF | — | 100 |
| 10 | L2-11 | 00:aa:bb:01:01:02 | 00:aa:bb:01:02:02 | OFF | — | 101 |
| 10 | L2-12 | 00:aa:bb:01:01:03 | 00:aa:bb:01:02:03 | ON | 1 | |
| 20 | L2-13 | 00:aa:bb:01:01:04 | 00:aa:bb:01:02:04 | ON | 2 | |

T5 LAYER-2 FLOW CONDITION TABLE

| VPN-ID | LOGICAL SENDING PORT | LAYER-2 SOURCE ADDRESS | LAYER-2 DESTINATION ADDRESS | TE FUNCTION FLAG | TE PATTERN | VIRTUAL SENDING PORT |
|---|---|---|---|---|---|---|
| 10 | L2-12 | 00:aa:bb:01:01:03 | 00:aa:bb:01:02:03 | ON | 2 | |

⇒ TE PATTERN=2 PATH FAILOVER

T8 FAILOVER TABLE

| LOGICAL SENDING PORT | VIRTUAL SENDING PORT | PATH STATUS |
|---|---|---|
| L2-12 | 100 | FAILED |
| | 101 | NORMAL |

FIG. 17

COMMUNICATIONS SYSTEM, AND SENDING DEVICE, IN A COMMUNICATION NETWORK OFFERING BOTH LAYER-2 AND LAYER-3 VIRTUAL PRIVATE NETWORK SERVICES

BACKGROUND OF THE INVENTION

1. Field of the Invention

The present invention is related to a communications system, and more particularly, to a communications system which provides virtual private network services.

2. Description of the Related Art

A new type of network services called "virtual private network" (VPN) has been deployed in recent years. VPN refers collectively to such services that enable us to connect and expand our private networks by incorporating a part of someone else's network (e.g., telephone carriers' or Internet providers') as an alternative to leased line services. With VPN techniques, a company with many offices all over the country to construct a large private network by interconnecting their local area networks (LANs) with the Internet. In general, VPNs are broadly divided into two groups: those based on layer 3 (network layer) and those based on layer 2 (data link layer).

FIG. 27 illustrates a configuration of a VPN 400 operating with layer-3 protocols (hereafter "layer-3 VPN"), where two end nodes 41 and 42 are connected via two intermediary nodes 401 and 402. As FIG. 27 shows, the intermediary nodes 401 and 402 have a protocol stack up to the layer 3.

Transport of Internet Protocol (IP) packets is one of the specific services that layer-3 VPNs can offer. Networks of this type are called "IP-VPNs," among which those using multi-protocol label switching (MPLS) techniques are of particular interest. MPLS IP-VPNs add a destination label to every IP packet, and the intermediary nodes forward labeled packets to the next hop according to their label values.

FIG. 28 shows a configuration of a VPN 300 operating with layer-2 protocols (hereafter "layer-2 VPN"), where two end nodes 31 and 32 are connected via two intermediary nodes 301 and 302. As FIG. 28 shows, the intermediary nodes 301 and 302 have a protocol stack up to the layer 2.

Such a layer-2 VPN provides virtual LAN (VLAN) services, for example, which enable a logical grouping of user stations regardless of their physical locations on the network. With VLAN techniques, remote offices using Ethernet (registered trademark of Xerox Corporation) can be connected with each other.

While IP-based or Internet-based layer-3 VPNs are currently dominant in terms of real-world implementations, layer-2 VPNs are facing increasing demands today. This is because layer-2 VPNs provide inter-office connections no matter what layer-3 protocols are employed in the user network. That is, layer-2 VPNs are advantageous over layer-3 VPNs when it comes to flexible virtual networking.

Conventional VPN techniques, however, only allow layer-2 and layer-3 VPNs to be implemented in physically separate networks. If these two types of VPNs were able to operate on a single integrated network, their services would be more flexible and expandable. The reality is contrary. It is not an easy task to construct such a network that allows combined use of layer-2 and layer-3 VPNs. A simple integration of layer-2 equipment into existing layer-3 VPN facilities would end up with a costly, inflexible system. In other words, we must not overlook cost-effectiveness and efficiency when building a combined VPN environment.

Another challenge is how to implement traffic engineering functions of layer-3 VPN in a combined VPN environment. Traffic engineering provides, for example, an automatic load balancing mechanism that deals with increased packet traffic on a particular route by splitting it into other less-congested routes, which layer-2 VPNs do not support. The combined VPN environment has to make such control functions act upon both layer-2 and layer-3 packets. Otherwise, a single link failure would lead to a long disruption of communication service, and a traffic congestion problem could result in delayed or lost data.

SUMMARY OF THE INVENTION

In view of the foregoing, it is an object of the present invention to provide a communications network in which both a layer-2 VPN and layer-3 VPN can operate in an efficient and cost-effective way to offer improved network services.

To accomplish the above object, according to the present invention, there is provided a communications system which provides VPN services for a layer-2 VPN and a layer-3 VPN through an intra-network transport path between network nodes, wherein the layer-2 VPN establishes a layer-2 VPN path for end-to-end communication, while the layer-3 VPN establishes a layer-3 VPN path for end-to-end communication.

This communications system comprises a sending device and a receiving device. The sending device permits the layer-2 VPN path and layer-3 VPN path to be established within the intra-network transport path, so as to deliver frames from a first part of the layer-2 and layer-3 VPNs to a second part of the layer-2 and layer-3 VPNs through the intra-network transport path. The sending device comprises: a path data manager which sets and manages path data describing configuration of the intra-network transport path; and a labeling unit which adds an intra-network transport label to each of the frames for transport over the intra-network transport path, based on the path data, the frames having been attached a VPN label for transport over the layer-2 or layer-3 VPN path.

The receiving device, on the other hand, receives frames from the sending device via the intra-network transport path. It comprises the following elements: a frame discrimination value setting unit which gives a frame discrimination value that is used to determine whether each received frame is a layer-2 VPN frame or a layer-3 VPN frame; and a redirection processor which redirects each received frame to the second part of the layer-2 VPN or the second part of the layer-3 VPN, according to the VPN label and the frame discrimination value.

Also, to accomplish the above object, the present invention provides a communications system which provides multi-protocol label-switched virtual private network (MPLS-VPN) services for a layer-2 VPN and a layer-3 VPN through a level-1 label-switched path (L1 LSP) that is established between network nodes for transport of MPLS frames having an L1 label as an outer label thereof, wherein the layer-2 VPN establishes a first level-2 label-switched path (L2 LSP) for end-to-end communication, while the layer-3 VPN establishes a second L2 LSP for end-to-end communication.

This communications system comprises an ingress edge node and an egress edge node. The ingress edge node permits the first and second L2 LSPs to be established within the L1 LSP, so as to deliver given frames from a first part of the layer-2 and layer-3 VPNs to a second part of the layer-2 and layer-3 VPNs through the L1 LSP. To this end, the ingress edge node comprises the following elements: a path data manager which sets and manages path data describing configuration of the L1 LSP, and a labeling unit which adds the L1 label to each given frame for transport over the L1 LSP, based on the path data, the given frame having been attached an L2 label as an inner label for transport over the first or second L2 LSP.

The egress edge node, on the other hand, receives the frames from the ingress edge node via the L1 LSP. It comprises: a frame discrimination value setting unit which gives a frame discrimination value that is used to determine whether each received frame is a layer-2 VPN frame or a layer-3 VPN frame, and a redirection processor which redirects each received frame to the second part of the layer-2 VPN or the second part of the layer-3 VPN, according to the L2 label and the frame discrimination value.

Furthermore, to accomplish the above object, the present invention provides a communications system for use in a communications network where packets are transported between edge nodes according to labels attached thereto. This communications system comprises an ingress edge node and an egress edge node. The ingress edge node comprises the following elements: a processor which constructs a first virtual private network (VPN) on a first layer and a second VPN on a second layer; a label determination unit which determines what label to use by identifying whether a given packet belongs to the first VPN or the second VPN; and an identifier adding unit which adds an identifier to a packet directed to the communications network to indicate to which VPN the packet belongs. The egress edge node, on the other hand, comprises the following elements: an identification unit which examines an identifier of an incoming packet received from the communications network to identify whether the incoming packet belongs to the first VPN or the second VPN; and a packet processor which processes the incoming packet, depending on the VPN identified by the identification unit.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIGS. 16 and 17 show how the system performs path failover.

DESCRIPTION OF THE PREFERRED EMBODIMENTS

Preferred embodiments of the present invention will be described below with reference to the accompanying drawings.

Figure 1:
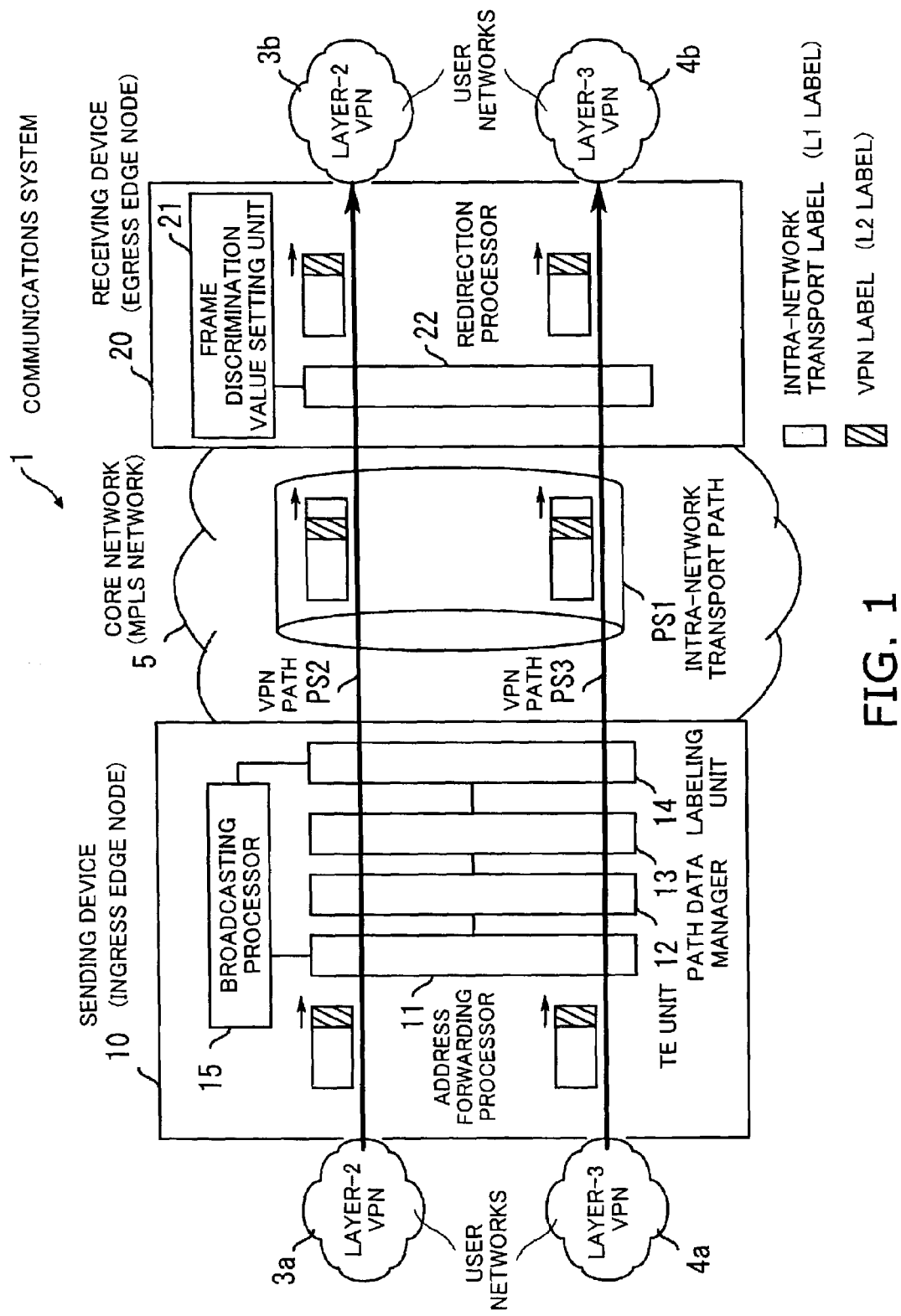
FIG. 1 is a conceptual view of a communications system according to the present invention.

FIG. 1 is a conceptual view of a communications system according to the present invention. The illustrated communications system 1 includes a sending device 10 and a receiving device 20. The sending device 10 will be referred hereafter as an ingress edge node 10, while the receiving device 20 as an egress edge node 20. The two nodes 10 and 20 are located at the ends of a core network 5, which is an MPLS network with multi-protocol label switching capabilities. The proposed system is intended for use in MPLS-VPN environments.

The ingress edge node 10 is connected to a layer-2 VPN 3a and layer-3 VPN 4a, which serves as user networks. Likewise, the egress edge node 20 is connected to a layer-2 VPN 3b and layer-3 VPN 4b. While FIG. 1 depicts the proposed ingress edge node 10 and egress edge node 20 as separate entities, their internal functions can be implemented in a single piece of equipment if it is appropriate.

The ingress edge node 10 has the following functional blocks: an address forwarding processor 11, a TE unit 12, a path data manager 13, a labeling unit 14, and a broadcasting processor 15. The address forwarding processor 11 examines the source address and destination data of each frame arriving from the layer-2 VPN 3a or layer-3 VPN 4a, so as to determine whether the ingress edge node 10 has already learnt and recorded them as part of its routing information. If not, the address forwarding processor 11 creates a new entry of routing information and registers it to a routing table, which will be described later. The new piece of routing information should be distributed by the broadcasting processor 15 to all network devices that can reach the ingress edge node 10 within the VPN of interest, thus prompting them to execute a learning process.

If, on the other hand, the ingress edge node 10 has a routing table entry that is appropriate for the frame in question, the address forwarding processor 11 determines which route to use for delivery of that frame. More specifically, in the case of layer-2 forwarding, the address forwarding processor 11 consults the routing table to extract a layer-2 destination address to determine the next hop on the route. In this table lookup operation, the address forwarding processor 11 relies on the layer-2 source address (MAC address) of the given frame, in combination with the identifier of a port through which the ingress edge node 10 has received the frame. Here, the term "MAC address" stands for Media Access Control (MAC) address. Similarly, in the case of layer-3 forwarding, the address forwarding processor 11 extracts a layer-3 destination address from the routing table, looking it up with the layer-3 source address (IP address) in combination with the identifier of the receiving port.

The traffic engineering unit 12 (hereafter, "TE Unit") controls data traffic over the layer-2 VPNs 3a and 3b, as well as the layer-3 VPNs 4a and 4b. More specifically, it provides at least one of the following traffic control functions: load balancing (split traffic into a plurality of routes), path failover (change delivery paths in the event of failure), protection switching (switch from working path to protection path in the event of failure), and service-dependent forwarding (redirect traffic to different routes, depending on service types). These functions will be described in detail later with reference to FIG. 10 and subsequent drawings.

The path data manager 13 sets and manages path data of an intra-network transport path PS1, over which frames with an intra-network transport label are transported. The term "path data" refers to what is registered in an L1 mapping table T6 (described later).

The intra-network transport path PS1 is a bundle of label-switched paths (LSPs) that are established between nodes on the MPLS network 5 through the use of routing protocols. More specifically, the ingress edge node 10 sets up this network connection by using MPLS protocols and the like when it detects the layer-3 address of the egress edge node 20.

VPN paths PS2 and PS3 are end-to-end LSP connections between peer entities in the layer-2 VPNs 3a and 3b and the layer-3 VPNs 4a and 4b, respectively. Every VPN frame has been added a VPN label for transport over the VPN path PS2 or PS3. The labeling unit 14 adds an intra-network transport label to each of such frames, based on the path data stored in the ingress edge node 10. It sends out the resultant labeled frames toward their destinations over the intra-network transport path PS1.

The egress edge node 20 has a frame discrimination value setting unit 21 and a redirection processor 22. The frame discrimination value setting unit 21 defines a frame discrimination value which is used to determine whether each received frame is a layer-2 VPN frame or a layer-3 VPN frame. The redirection processor 22 determines to which VPN each received frame belongs, either the layer-2 VPN or the layer-3 VPN, based on the frame discrimination value and VPN label of that frame. The redirection processor 22 then redirects such frames to their respective destinations, the layer-2 VPN 3b or layer-3 VPN 4b.

With the above-described transport functions, the proposed communications system 1 permits the layer-2 VPN path PS2 and layer-3 VPN path PS3 to share a single intra-network transport path PS1 between two edge nodes. This feature of the present invention enables a common core MPLS network 5 to transport traffic of both layer-2 VPN and layer-3 VPN in a mixed way.

Figure 2:
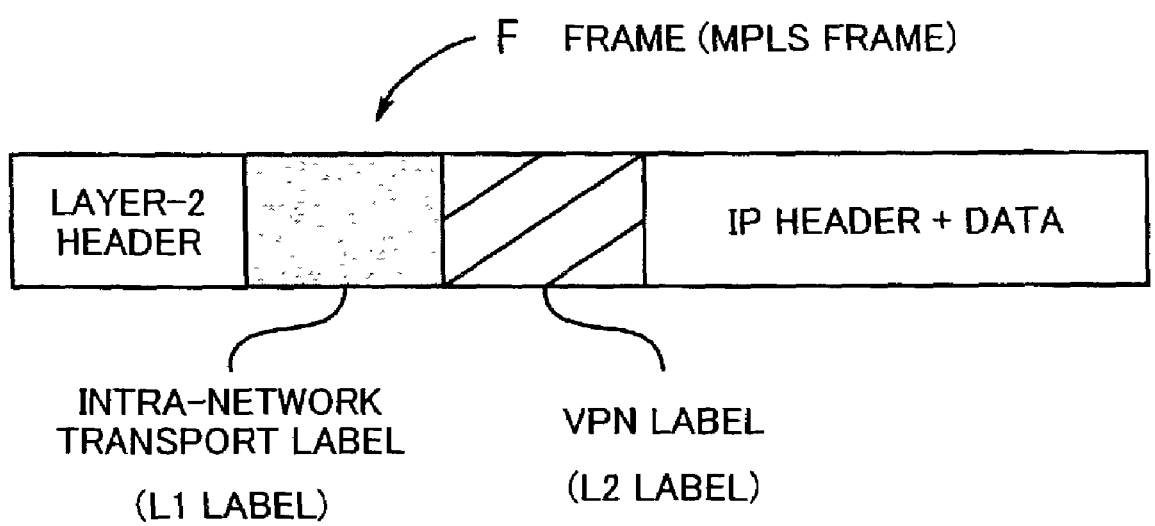
FIG. 2 shows a format of frames.

Referring next to FIG. 2, the frame format used in the proposed communications system 1 will be explained. As FIG. 2 shows, the MPLS frame F consists of the following fields: layer-2 header, intra-network transport label, VPN label, and IP datagram (i.e., IP header followed by data).

The intra-network transport path PS1 is an LSP defined by the intra-network transport label which is attached to frames as an outer label in the MPLS network 5. The VPN paths PS2 and PS3, on the other hand, are LSPs defined by VPN labels which are added to each frame as an inner label in the MPLS network 5. The terms "L1 label" and "L2 label" will be used in the following sections to refer to an intra-network transport label and VPN label, respectively. Also, the intra-network transport path will be referred to as "L1 LSP," and VPN path as "L2 LSP," where the letter "L" denotes "label."

According to the present invention, the ingress edge node 10 uses various tables to control the frame traffic. While tables are employed for both layer 2 and layer 3, the following sections will only describe the tables related to layer 2.

Figure 3:
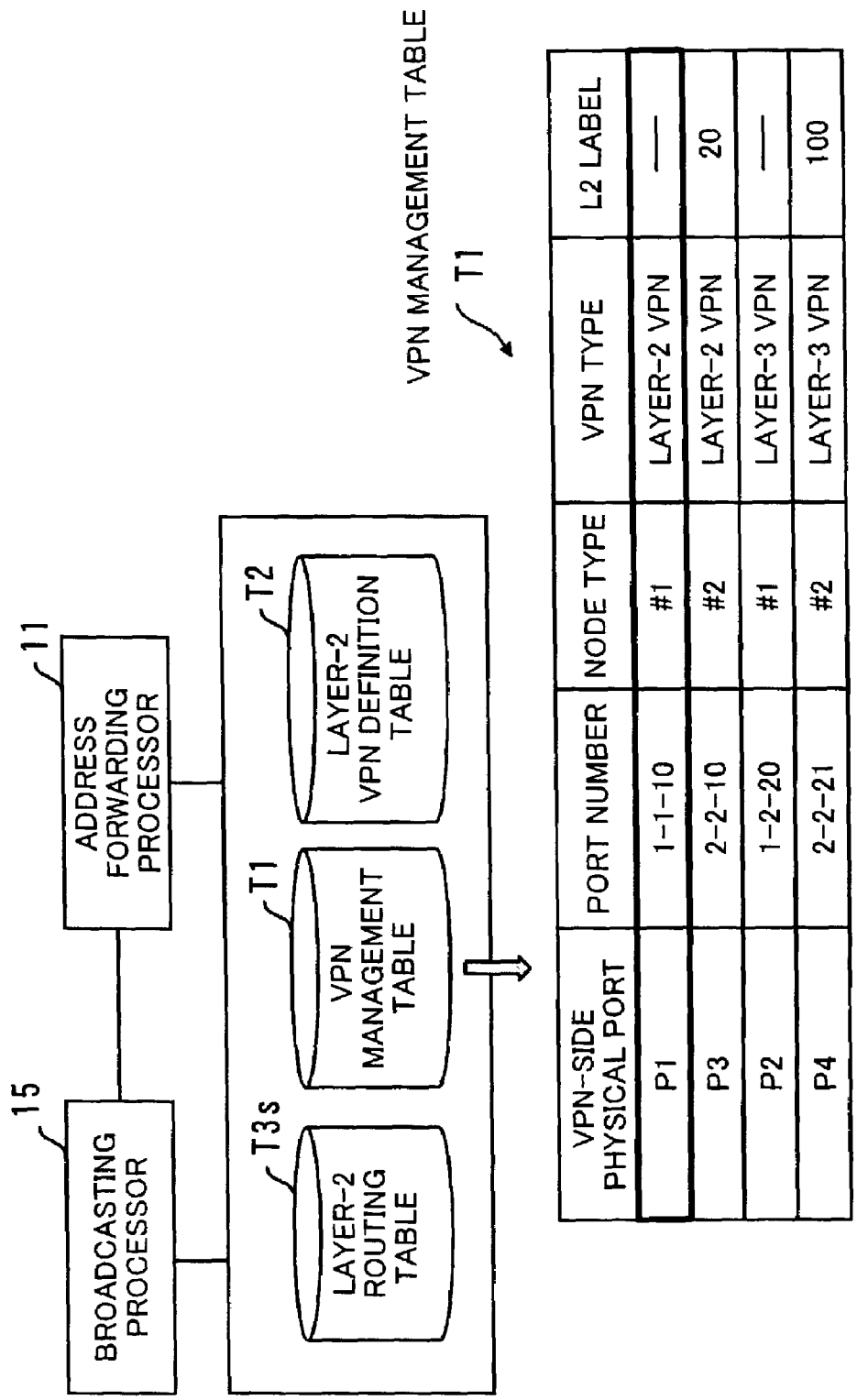
FIG. 3 shows a VPN management table.

FIG. 3 shows a VPN management table T1, which indicates the association between ports and VPNs. The address forwarding processor 11 and broadcasting processor 15 consult this table T1 when they need such information. The VPN management table T1 has the following data fields: "VPN-side Physical Port," "Port Number," "Node Type," "VPN Type," and "L2 Label."

The VPN-side physical port field of this table T1 contains information for identifying a port being used to interface with a VPN. When the port is not of the ingress edge node 10 itself, the VPN management table T1 further provides the L2 label of an L2 LSP reaching that port. In the example of FIG. 3, the second and fourth table entries represent such remote ports P3 and P4 with L2 label definitions. These L2 labels are used when broadcasting some information.

Figure 4:
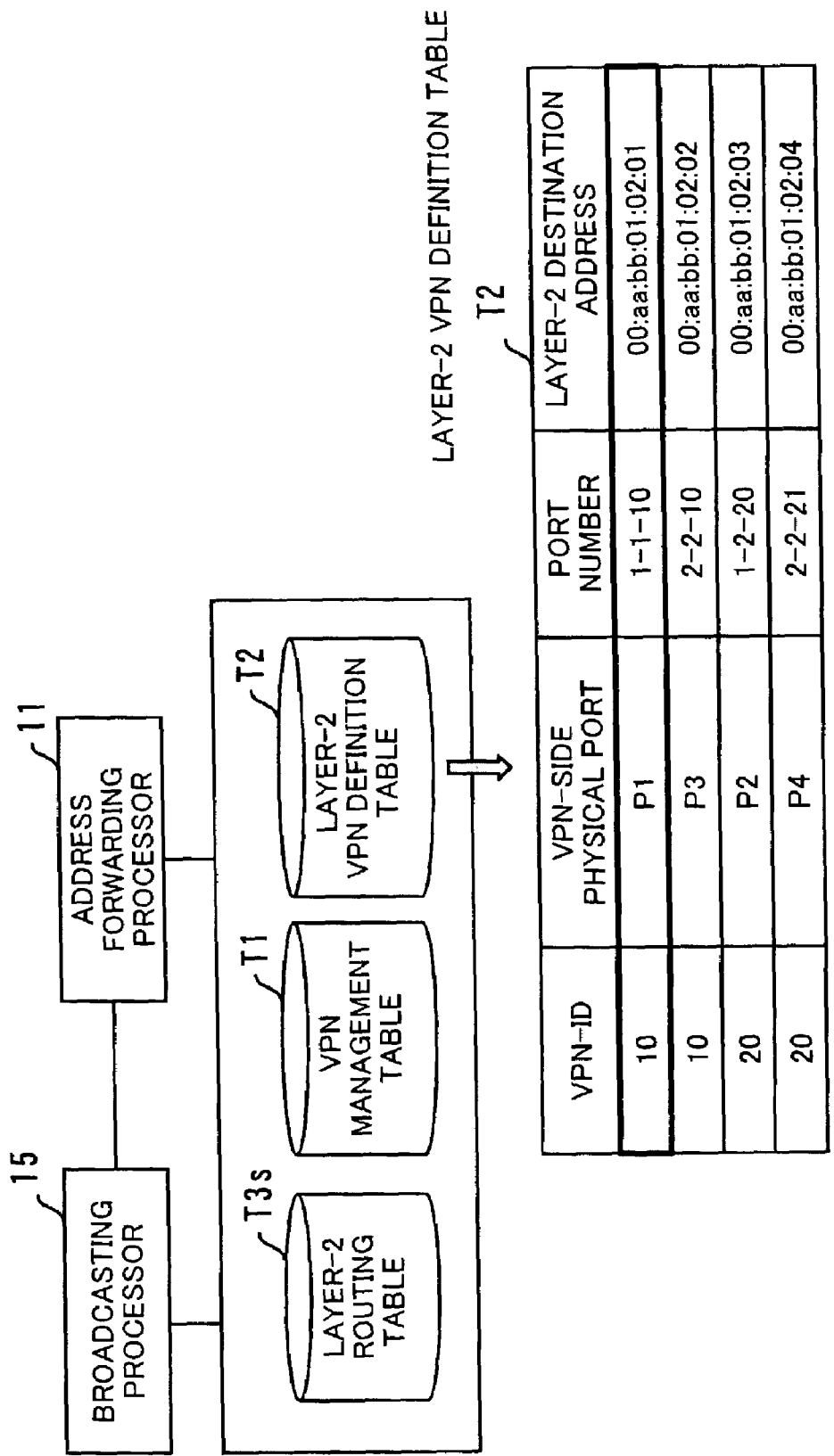
FIG. 4 shows a layer-2 VPN definition table.

FIG. 4 shows a layer-2 VPN definition table T2, which is referenced by the address forwarding processor 11 and broadcasting processor 15. This layer-2 VPN definition table T2 has the following data fields: "VPN-ID," "VPN-side Physical Port," "Port Number," and "Layer-2 Destination Address."

The address forwarding processor 11 and broadcasting processor 15 also maintain a layer-2 routing table T3s, which contains layer 2 routing information including: layer-2 source addresses, receiving port identifiers, layer-2 destination addresses. FIG. 4 shows a layer-2 routing table T3s in the ingress edge node 10, while a similar table is employed in the redirection processor 22 of the egress edge node 20. The latter table is referred to as the "layer-2 routing table T3r."

Figure 5:
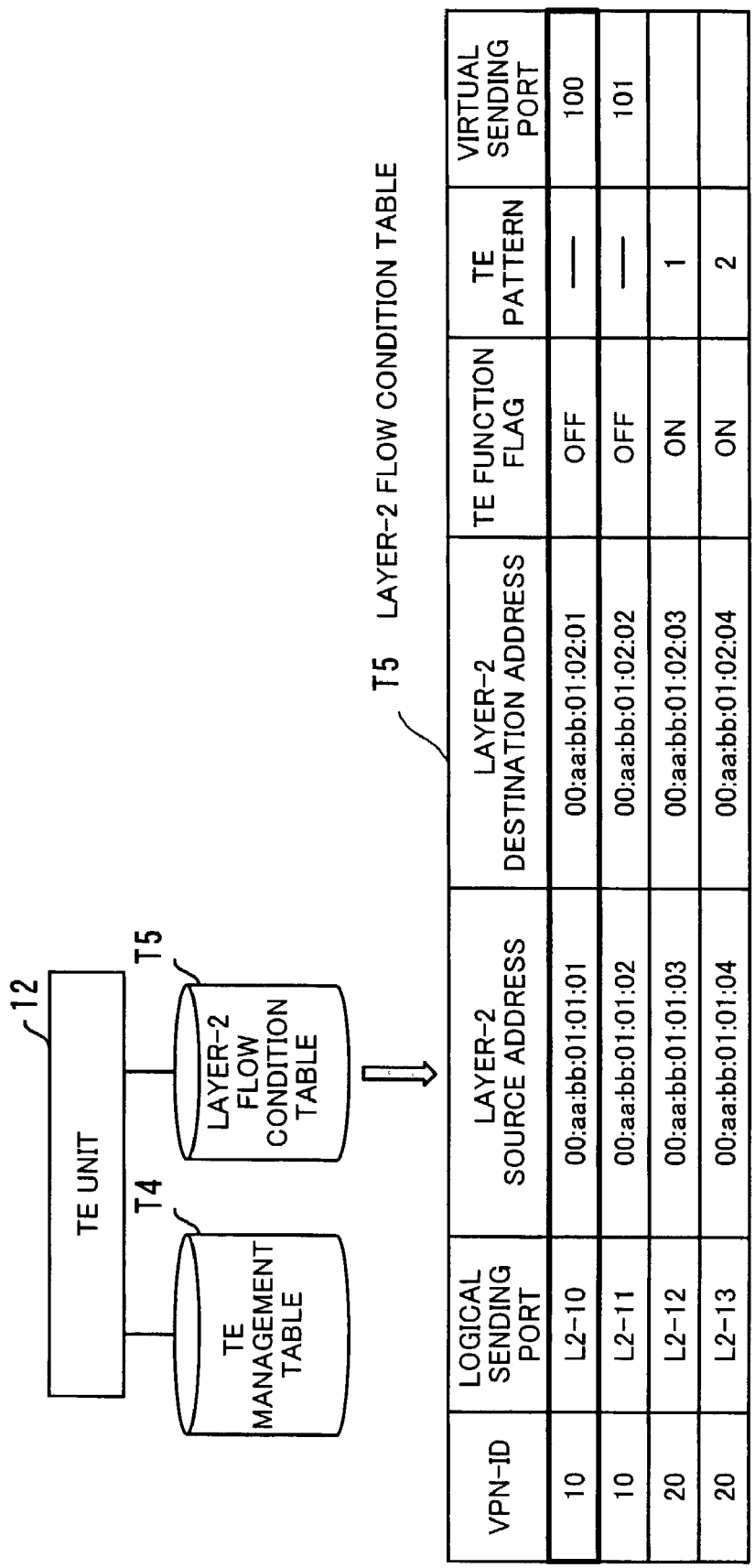
FIG. 5 shows a layer-2 flow condition table.

FIG. 5 shows a layer-2 flow condition table T5. Besides using a TE management table T4 (described later), the TE unit 12 maintains this table T5 to manage the setup of traffic engineering functions for layer-2 transport. The layer-2 flow condition table T5 has the following data fields: "VPN-ID," "Logical Sending Port," "Layer-2 Source Address," "Layer-2 Destination Address," "TE Function Flag," "TE Pattern," and "Virtual Sending Port."

Figure 6:
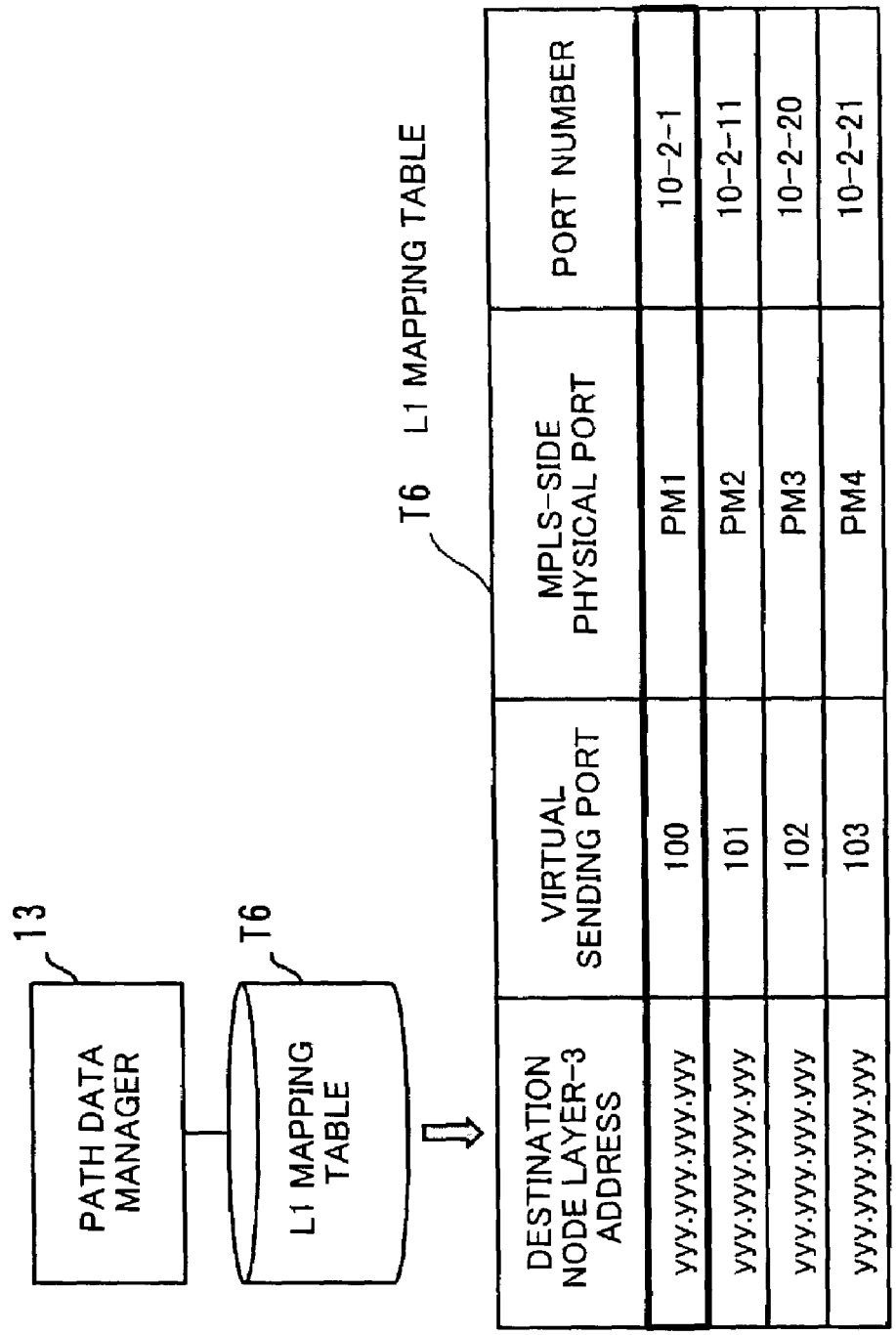
FIG. 6 shows an L1 mapping table.

FIG. 6 shows an L1 mapping table T6, which maintains, under the control of the path data manager 13, path data including the layer-3 address of the egress edge node 20 and parameters of L1 LSPs. This table T6 has the following data fields: "Destination Node Layer-3 Address," "Virtual Sending Port," "MPLS-Side Physical Port," and "Port Number."

While FIGS. 3 to 6 only show tables related to layer 2, the path data manager 13 also has a similar set of tables for layer 3. More specifically, there are layer-3 routing tables similar to the layer-2 routing tables T3s and T3r, a layer-3 VPN definition table similar to the layer-2 VPN definition table T2, and a layer-3 flow condition table similar to the layer-2 flow condition table T5.

Figure 7:
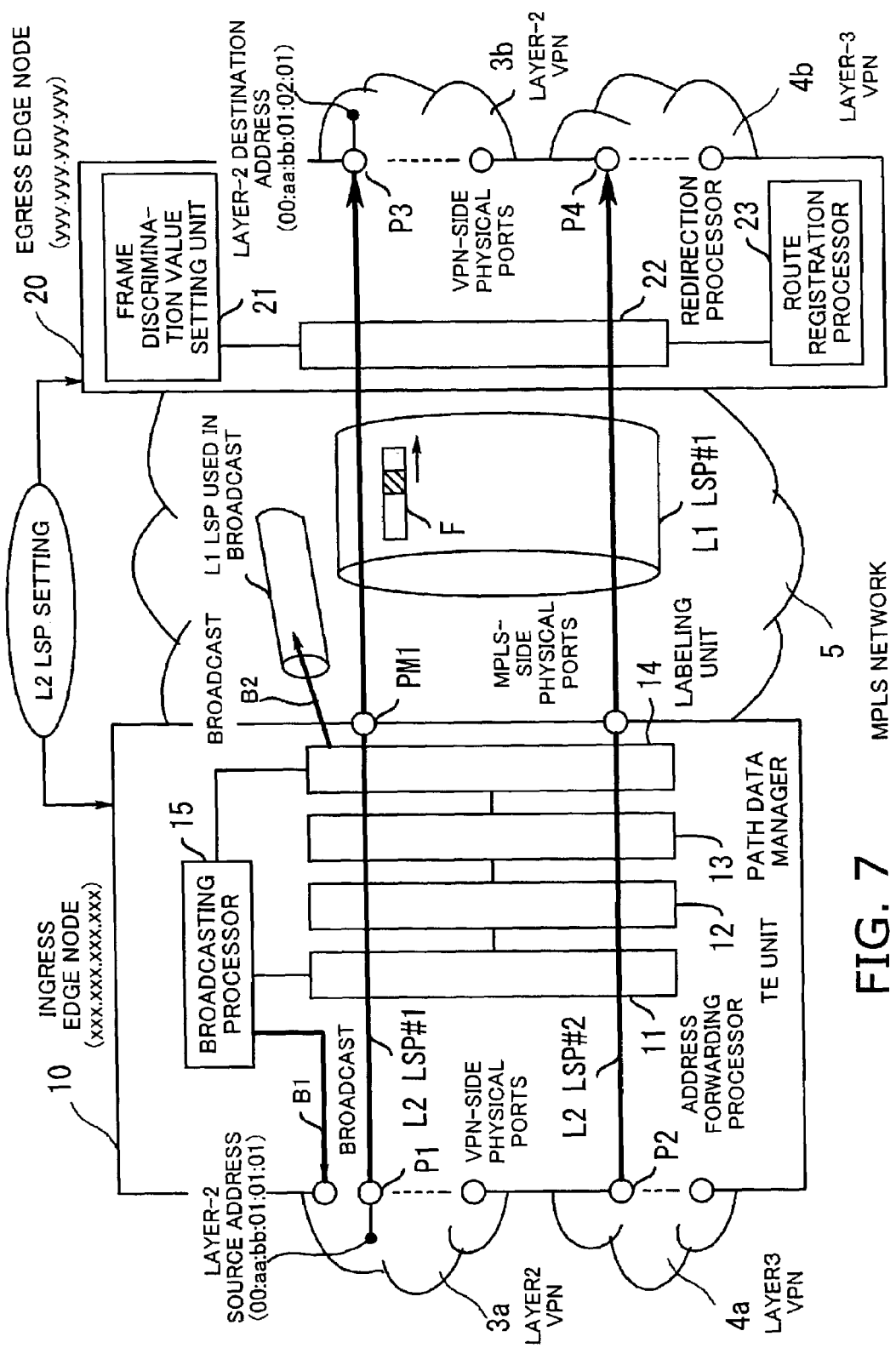
FIG. 7 schematically shows how the proposed system operates.

Referring now to FIG. 7, along with the tables described in FIGS. 3 to 6, the following section will described the operation of the proposed communications system in greater detail. FIG. 7 schematically shows how the system operates. The ingress edge node 10 with a layer-3 address of "xxx.xxx.xxx.xxx" is linked to the egress edge node 20 with a layer-3 address of "yyy.yyy.yyy.yyy" through L1 LSP#1, and two VPN paths L2 LSP#1 and L2 LSP#2 are established as part of that L1 LSP#1. More specifically, a first VPN path L2 LSP#1 is set up between peer layer-2 VPNs 3*a* and 3*b* via a first VPN-side physical port P1 of the ingress edge node 10 and a first VPN-side physical port P3 of the egress edge node 20. The second VPN path L2 LSP#2 is set up between peer layer-3 VPNs 4*a* and 4*b* via a second VPN-side physical port P2 of the ingress edge node 10 and a second VPN-side physical port P4 of the egress edge node 20. The elements of the edge nodes 10 and 20 are the same as those in FIG. 1, except that a route registration processor 23 is added as a function of the egress edge node 20.

For illustration, consider that only L2 LSP#2 has been established between the layer-3 VPNs 4*a* and 4*b*, but L2 LSP#1 has not. L1 LSP#1 is now going to accommodate another path L2 LSP#1 between the layer-2 VPNs 3*a* and 3*b*.

The explanation starts with the registration of L2 LSP at the egress edge node 20. This process is executed with user commands or dynamic configuration using relevant protocols for layer-2 VPN registration. The frame discrimination value setting unit 21 then defines a frame discrimination value, which is used to determine whether each received frame is a layer-2 VPN frame or a layer-3 VPN frame.

The frame discrimination value actually serves as a threshold for determining the frame types. Consider, for example, that the value of an L2 label ranges from 0 to 500, the first half (0–250) being assigned to layer-2 VPN frames and the second half (251–500) to layer-3 VPN frames. In this case, the frame discrimination value is set to "250," the critical label value. With this value "250," the redirection processor 22 (described later) sorts incoming frames into the two groups described above.

L2 LSP should also be registered at the other edge node 10, the process of which is executed with user commands or dynamic configuration using relevant protocols for layer-2 VPN registration. Recognizing itself as the ingress node, the node 10 configures its local functional blocks to add a new entry to the VPN management table T1, layer-2 VPN definition table T2, and layer-2 flow condition table T5.

When all the above tables are updated, the broadcasting processor 15 distributes the setup information to all devices that may be used to interconnect layer-2 VPNs, thereby prompting them to learn the new network configuration. The path data manager 13 subsequently retrieves information about the L1 LSP that reaches the destination, i.e., the egress edge node 20. In the present example, that LSP is L1 LSP#1. It extracts parameters regarding the layer-3 addresses of the egress edge node 20 (including the virtual sending ports, MPLS-side physical ports, and port numbers mentioned earlier) and enters them to the L1 mapping table T6.

The ingress edge node 10 now receives frames from the layer-2 VPN 3*a* and forwards to the MPLS network 5 in the following way. Consider that a frame with a layer-2 destination address 00:aa:bb:01:02:01" is produced in the layer-2 VPN 3*a*. When this frame reaches the VPN-side physical port P1 of the ingress edge node 10, the address forwarding processor 11 first identifies its VPN type by consulting the VPN management table T1. In the present example, the source network turns out to be a layer-2 VPN since the frame was received through the VPN-side physical port P1. The address forwarding processor 11 then looks up the layer-2 VPN definition table T2 with the layer-2 destination address (00:aa:bb:01:02:01) as a keyword, thus obtaining a VPN-ID of "10."

The address forwarding processor 11 searches the layer-2 routing table T3*s* to determine whether it has an entry for the received frame's layer-2 destination address (00:aa:bb:01:02:01). If the destination address in question is found, then the address forwarding processor 11 makes the TE unit 12 (described later) look up the layer-2 flow condition table T5 to extract an appropriate virtual sending port. With this virtual sending port (port "100" in the present case), the path data manager 13 consults the L1 mapping table T6 to find a corresponding MPLS-side physical port, which is PM1 in the present context. Based on the above MPLS-side physical port, the labeling unit 14 produces an L1 label for transport over L1 LSP#1, thereby creating an MPLS frame F described earlier in FIG. 2. This MPLS frame F is transmitted to the MPLS network 5 through the MPLS-side physical port PM1.

If, on the other hand, the layer-2 destination address (00:aa:bb:01:02:01) of the received frame is not found in the layer-2 routing table T3*s*, the broadcasting processor 15 broadcasts the relevant routing information to all devices that belongs to the layer-2 VPN with the VPN-ID of "10," besides entering it to the layer-2 routing table T3*s* of its own.

To broadcast a message to a particular VPN, the broadcasting processor 15 needs to know which ports are actually used in that VPN. It thus consults the layer-2 VPN definition table T2 and layer-2 flow condition table T5 to retrieve all necessary port parameters that are relevant to the layer-2 destination address of the received frame. The resulting list of ports may include those of the ingress edge node 10 itself and those of other nodes. The former group of ports are connected not to the MPLS network 5, but to other layer-2 users that are local to the ingress edge node 10 itself. The broadcasting processor 15 then directly sends out a frame containing intended information through those ports, as indicated by the symbol "B1" in FIG. 7. For the latter group of ports, on the other hand, the broadcasting processor 15 passes the frame to the labeling unit 14, since the frame needs an L1 label to travel over the MPLS network 5. The labeling unit 14 then sends out the frame via an L1 LSP for broadcasting, after adding an L1 label associated with the VPN-ID, as indicated by the symbol "B2" in FIG. 7. In this way, the ingress edge node 10 broadcasts routing information.

The MPLS network 5 conveys the above-described MPLS frame F to the egress edge node 20. The egress edge node 20 then delivers it to the specified destination, i.e., the layer-2 VPN 3*b*, in the following way.

Upon receipt of an MPLS frame F, the egress edge node 20 first subjects the received frame F to label forwarding processing, which is a preprocess for handling L1 label information. More specifically, the label forwarding process examines the L1 label of the received frame F to determine whether to send it to the next hop. In the present example, the node 20 recognizes itself as the egress node for that frame F, thus removing the L1 label from the frame F and outputting the rest to an internal port.

After that, the redirection processor 22 compares the L2 label of the received frame with the frame discrimination value that has been determined by the frame discrimination value setting unit 21, thereby determining whether that frame is from the layer-2 VPN 3*a* or layer-3 VPN 4*a*. If the L2 label indicates that the frame originates from the layer-2 VPN 3*a*, the route registration processor 23 determines whether the layer-2 source address (00:aa:bb:01:01:01) is registered as an entry of the layer-2 routing table T3*r*. If not, it updates the layer-2 routing table T3*r* with the new layer-2 source address and other relevant routing information. If the address is already registered, the redirection processor 22 removes the L2 label from the frame and reforms it into a layer-2 MAC frame for delivery to the layer-2 VPN 3b through an appropriate port (P3 in the present example).

According to the present invention, the above-described control functions enable both L2 LSP traffic on layer-2 VPNs and L2 LSP traffic on layer-3 VPNs to be carried together over a common set of data transport facilities. While we have only discussed so far the procedure of setting up L2 LSPs for transporting layer-2 VPN frames over L1 LSP#1, a similar method can be used to create L2 LSPs for layer-3 VPN traffic.

Figure 8:
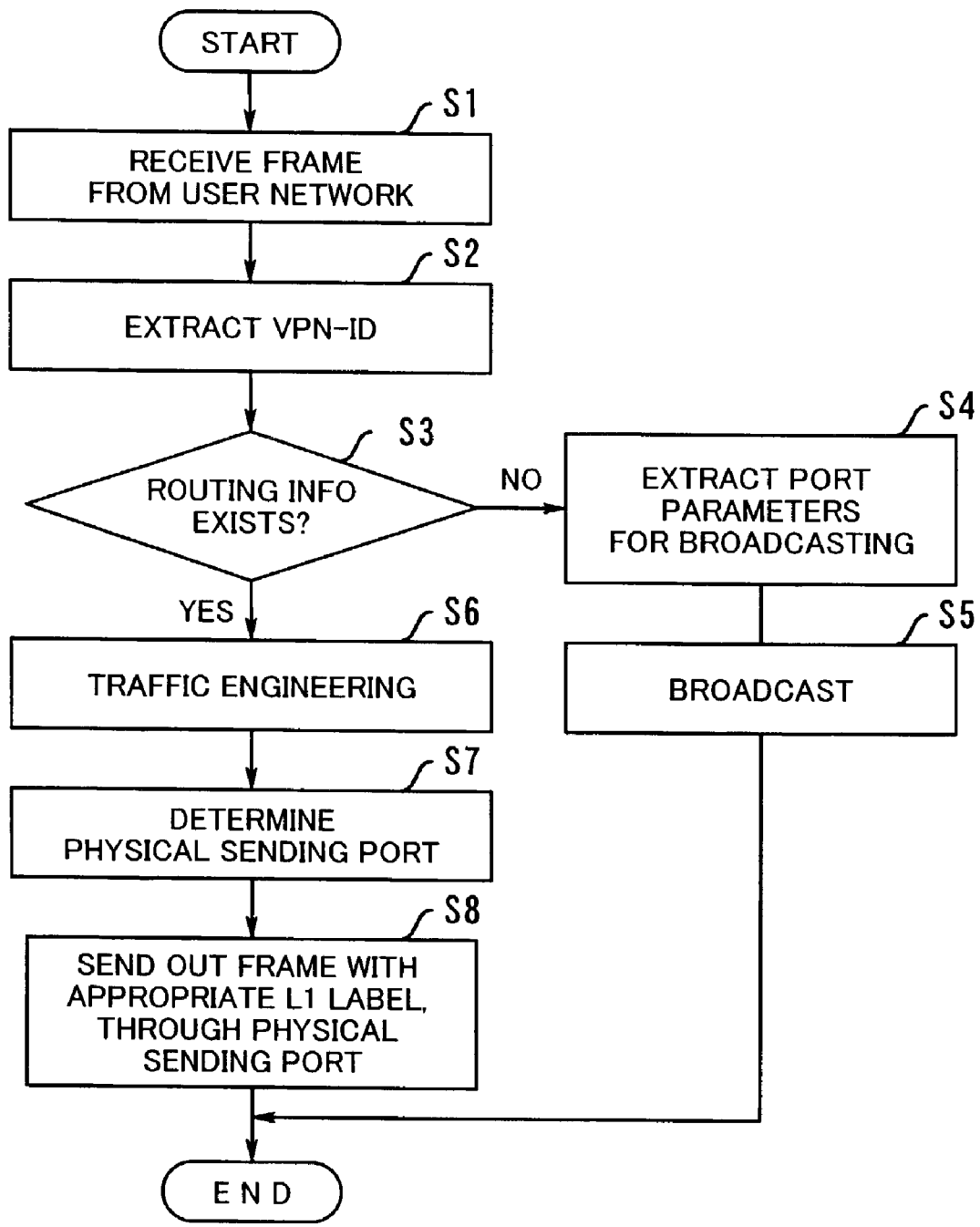
FIG. 8 is a flowchart showing the operation of an ingress edge node.

Referring now to the flowchart of FIG. 8, we will describe how the ingress edge node 10 operates when a frame is received from a user network. The flowchart shows the following steps:

(S1) The ingress edge node 10 receives a frame from a user network, the frame being either a MAC frame from the layer-2 VPN 3a or an IP frame from the layer-3 VPN 4a.

(S2) The address forwarding processor 11 consults the VPN definition table to extract a VPN-ID that is associated with the receiving port.

(S3) The address forwarding processor 11 checks whether the destination address of the received frame is registered in the routing table. If it is registered, the process advances to step S6. If not, the process branches to step S4.

(S4) The broadcasting processor 15 extracts port parameters about broadcast destinations.

(S5) The broadcasting processor 15 performs a broadcasting process. More specifically, the broadcasting processor 15 redirects the frame to the ports specified in the port parameters extracted at step S4. For the ports of the ingress edge node 10 itself, the broadcasting processor 15 outputs the frame through them without adding anything to it. For the ports of other nodes, the broadcasting processor 15 passes the frame to the labeling unit 14, requesting to add an L1 label corresponding to the VPN-ID and send out the labeled frame to the MPLS network 5.

Figure 10:
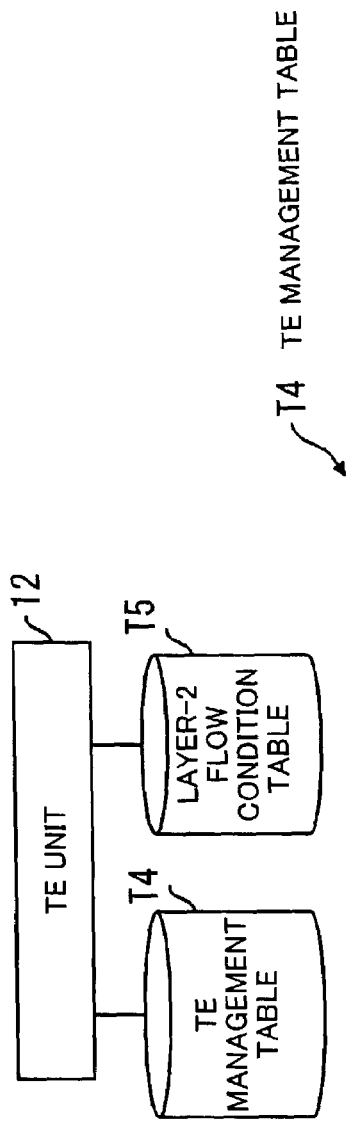
FIG. 10 shows a TE management table and a layer-2 flow condition table.

(S6) The TE unit 12 performs traffic engineering, which will be described later in FIG. 10 and subsequent drawings.

(S7) The path data manager 13 finds a relevant virtual sending port in the layer-2 flow condition table T5, and based on that, it then consults the L1 mapping table T6 to determine which MPLS-side physical port to use.

(S8) The labeling unit 14 adds an appropriate L1 label to the frame and sends it out to the MPLS network 5 through the MPLS-side physical port determined at step S7.

Figure 9:
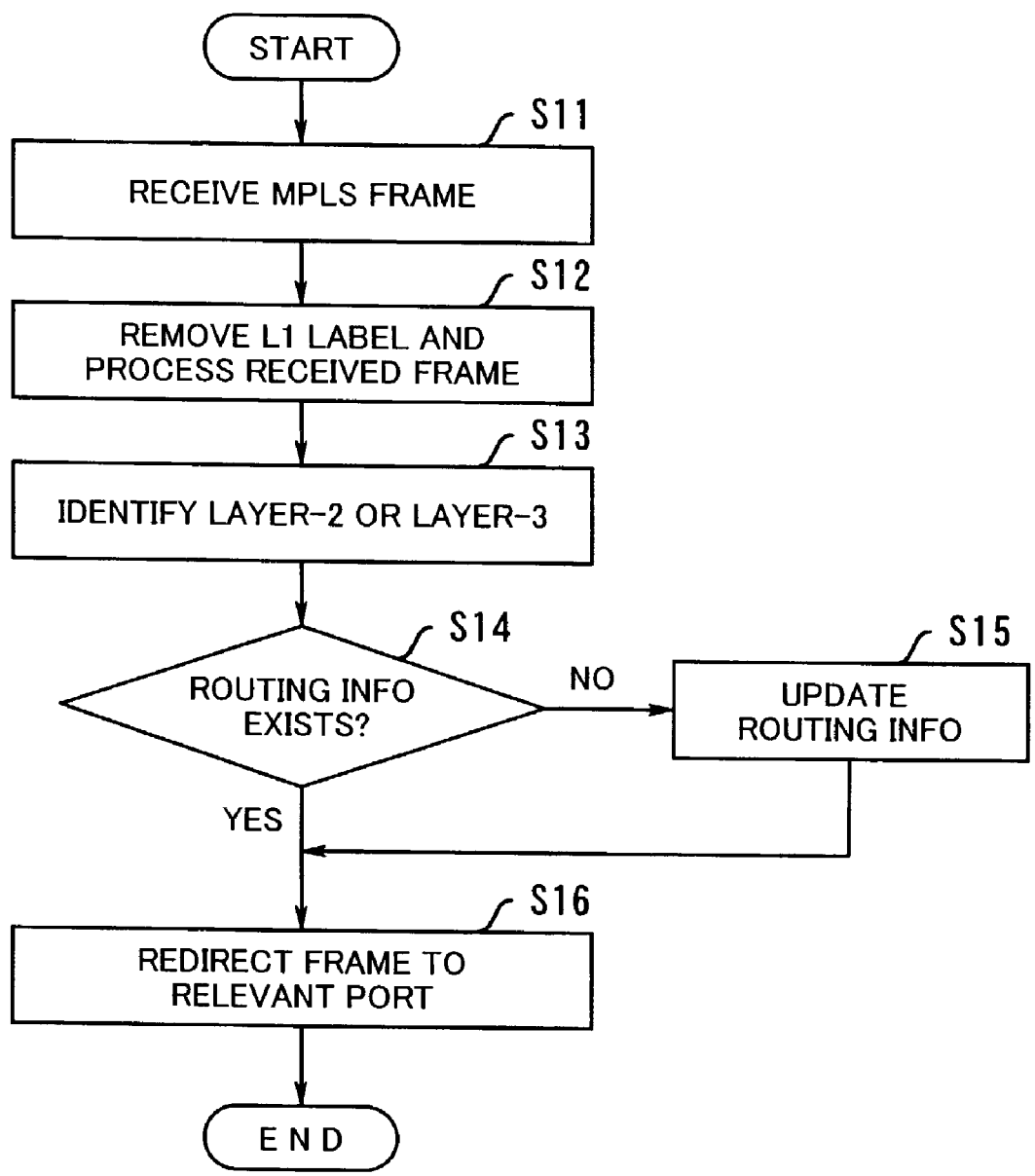
FIG. 9 is a flowchart showing the operation of an egress edge node.

Referring next to the flowchart of FIG. 9, we will describe how the egress edge node 20 operates when a frame is received from the MPLS network 5. The flowchart shows the following steps:

(S11) The egress edge node 20 receives an MPLS frame F.

(S12) The redirection processor 22 removes the L1 label from the received MPLS frame F for the purpose of subsequent reception processing.

(S13) The redirection processor 22 determines whether the frame is from a layer-2 VPN or a layer-3 VPN, by comparing its L2 label with the frame discrimination value.

(S14) The route registration processor 23 checks whether the source address is registered in its local routing table. If it is not registered, the process proceeds to step S15. If it is, the process advances to step S16.

(S15) The route registration processor 23 updates the routing table with the source address and other related parameters. That is, the egress edge node 20 has learnt a new route of frames on the network.

(S16) The redirection processor 22 redirects the frame to a relevant port for delivery to the destination user network.

Referring next to FIGS. 10 to 26, we will focus on the TE unit 12. The TE unit 12 in the ingress edge node 10 is responsible for control L1 LSP traffic. FIG. 10 shows an example of the TE management table T4 and layer-2 flow condition table T5. The TE management table T4 has the following data fields: "L2 Label for Transmission," "VPN-side Physical Port," "VPN-side Logical Port," and "Layer."

When a frame is received, the TE unit 12 first determines whether it is a layer-2 VPN frame or layer-3 VPN frame, with reference to the TE management table T4. The TE unit 12 knows which VPN-side physical port was used, and it serves as a key information in looking up the table T4.

Suppose that the received frame turns out to be of a layer-2 VPN. The TE unit 12 then searches the layer-2 flow condition table T5, based on the layer-2 source address (00:aa:bb:01:01:03) and layer-2 destination address (00:aa:bb:01:02:03). If the table T5 has a relevant record, then the TE unit 12 checks the status of "TE Function Flag" in that record, thus determining whether to subject the frame to traffic engineering tasks. The TE function flag in an "ON" state indicates that frames have to be traffic-engineered according to the value in the TE Pattern field. The TE unit 12 controls the flow of layer-2 VPN frames with its traffic engineering functions, as well as determining which virtual sending port to use for forwarding the frames.

Here, the virtual sending port is designated in the layer-2 flow condition table T5 when the TE function flag is "OFF." When the flag is "ON," the virtual sending port will be found not in the layer-2 flow condition table T5, but in other tables (described later), depending on the TE pattern field value. The virtual sending port is determined in either way, which is passed to the path data manager 13 to yield a relevant MPLS-side physical port of L1 LSP. The labeling unit 14 then adds an appropriate label to the frame for transmission over the MPLS network 5. While the above explanation has assumed layer-2 frames, the same control method applies also to layer-3 frames, with a layer-3 flow condition table instead.

The proposed communications system supports several kinds of traffic engineering functions, which are specified by TE pattern field values in the layer-2 and layer-3 flow condition tables. They include: load balancing (TE pattern=1), path failover (TE pattern=2) protection switching (TE pattern=3), and service-dependent forwarding (TE pattern=4). The following sections will be devoted to explanation of those TE functions.

Figure 11:
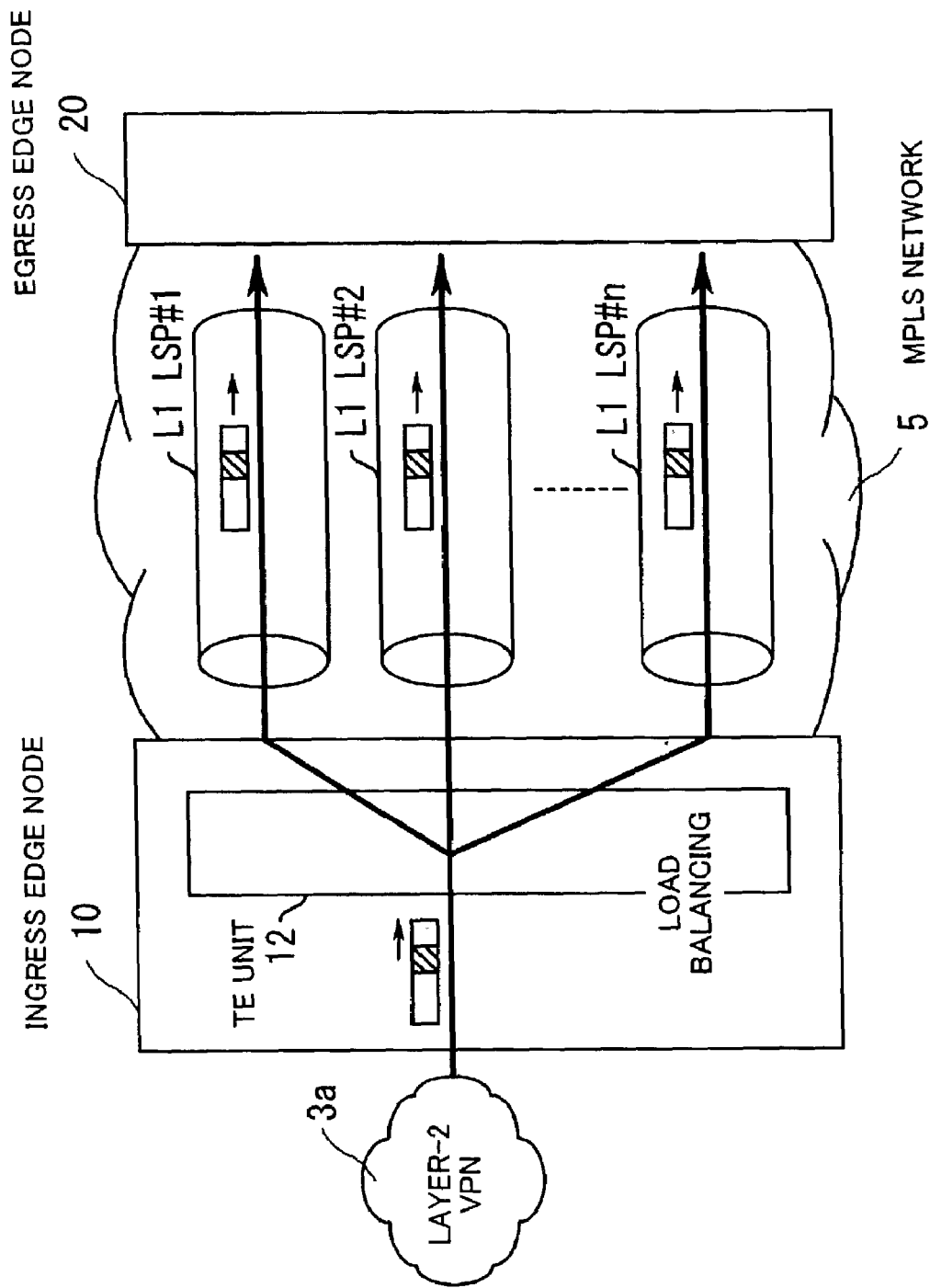
FIG. 11 shows the concept of load balancing.

Referring first to FIGS. 11 to 14, we will describe the load balancing function (TE pattern=1). FIG. 11 depicts the concept of load balancing, where only the TE unit 12 is shown in the ingress edge node 10 for simplicity purposes.

Consider that the ingress edge node 10 is receiving a series of frames from its local layer-2 VPN 3a. The TE unit 12 examines whether to subject this frame traffic to any of the traffic engineering processes. If the TE pattern is set to "1," the TE unit 12 executes a load balancing process and forwards the frames to their destinations through a plurality of paths (e.g., L1 LSP#1 to L1 LSP#n).

Figure 12:
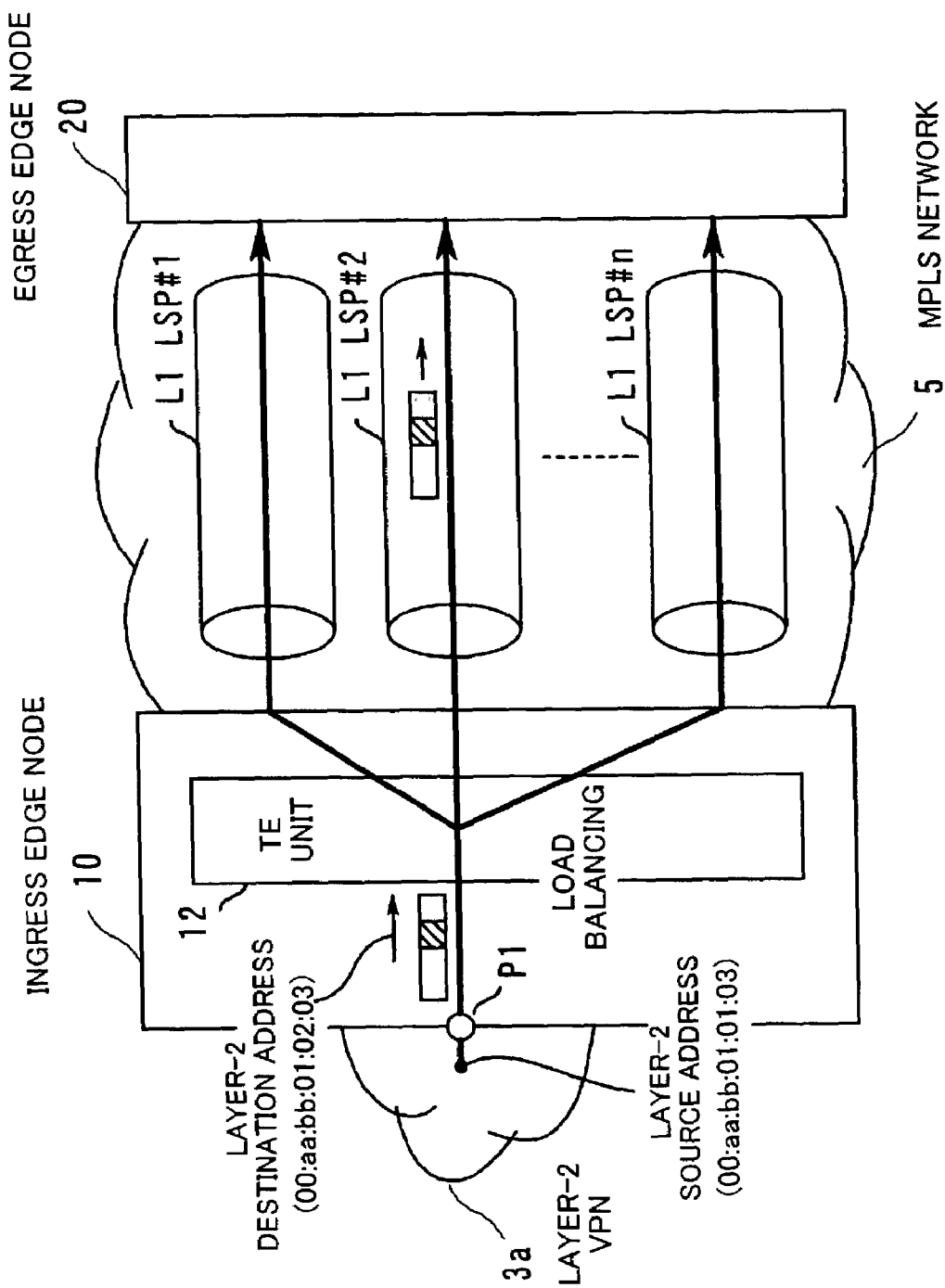
FIGS. 12 and 13 show how the system performs load balancing.
Figure 13:
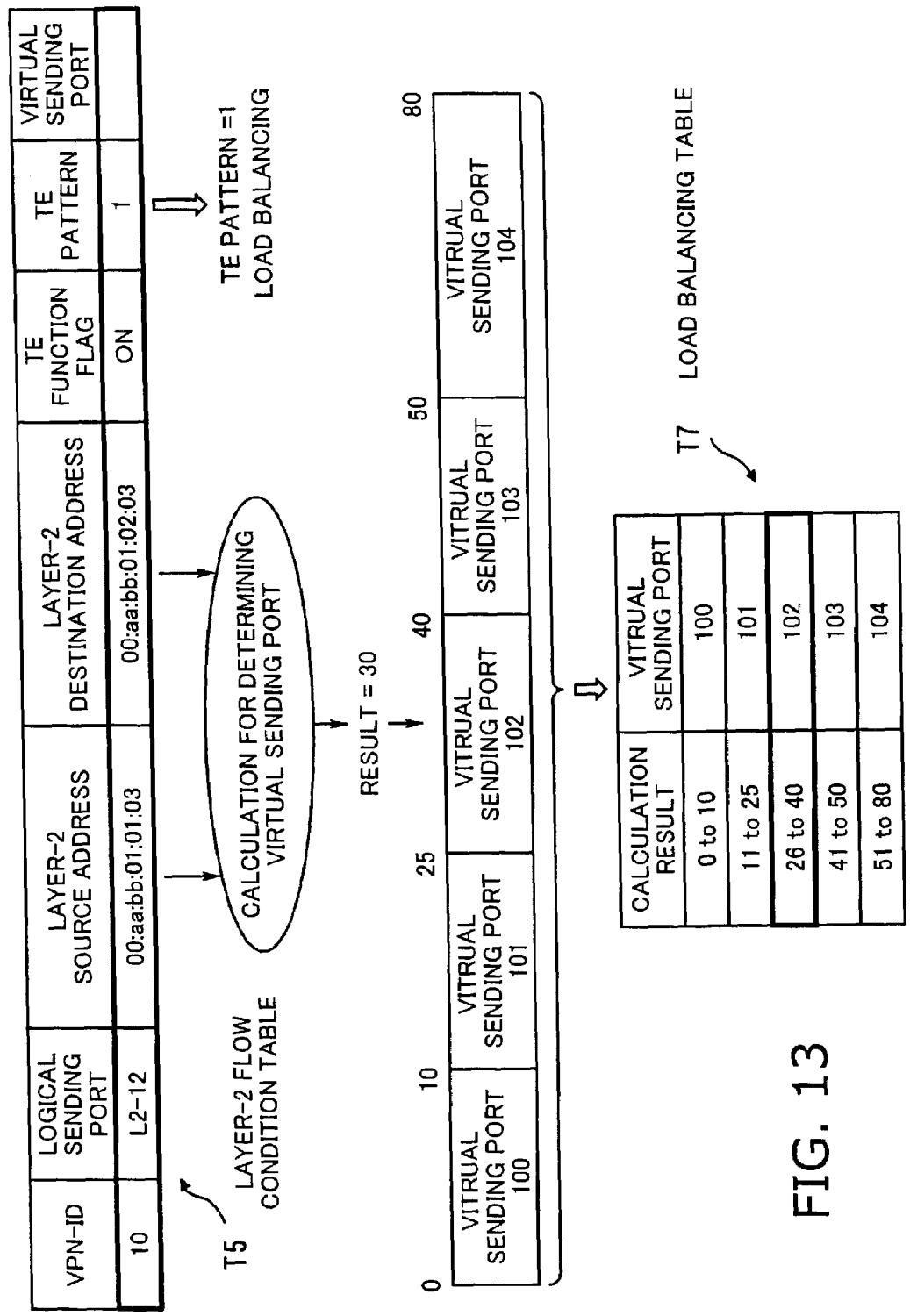

FIGS. 12 and 13 explain the load balancing function in greater detail. The TE unit 12 consults the layer-2 flow condition table T5, based on the layer-2 source address (00:aa:bb:01:01:03) and layer-2 destination address (00:aa:bb:01:02:03). This reveals that the received frame is a subject of the load balancing (TE pattern=1). Subsequently, the TE unit 12 calculates a certain value from the layer-2 source and destination addresses. The range of this value is assumed to be, for example, from 0 to 80, which is divided into five subranges. Each individual subrange is associated previously with a specific virtual sending port as follows: 0 to 10 (virtual sending port 100), 11 to 25 (101), 26 to 40 (102), 41 to 50 (103), 51 to 80 (104). Those subranges are defined to introduce particular load balancing ratios to the VPN traffic of interest, and they are set in a load balancing table T7.

For illustration, suppose that the above-described calculation has produced a pseudo random value of 30, out of the layer-2 source address (00:aa:bb:01:01:03) and layer-2 destination address (00:aa:bb:01:02:03). The load balancing table T7 suggests the use of virtual sending port "102." With this result, the path data manager 13 finds an MPLS-side physical port associated with the virtual sending port "102" obtained above, consulting an L1 mapping table T6 (not shown). The labeling unit 14 then adds a relevant L1 label to the frame and sends out the resulting MPLS frame F via the MPLS-side physical port and its corresponding L1 LSP, thus delivering the frame over the MPLS network 5.

Figure 14:
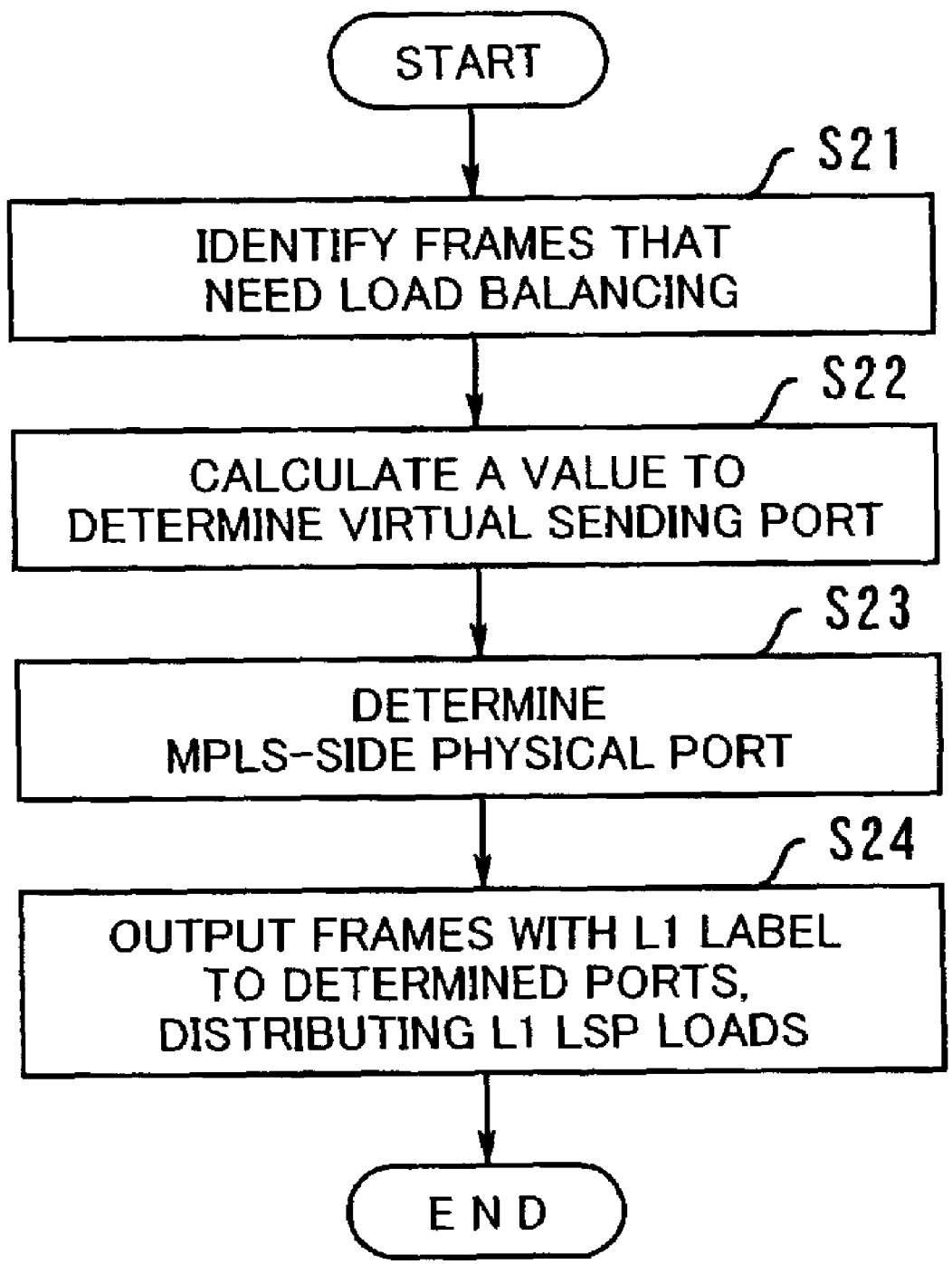
FIG. 14 is a flowchart of a series of processing tasks, from load balancing calculation to output of MPLS frames.

FIG. 14 is a flowchart showing a series of processing tasks, from load balancing calculation to output of an MPLS frame F, which includes the following steps:

(S21) The TE unit 12 consults the layer-2 flow condition table T5, based on a given layer-2 source address and layer-2 destination address. This reveals that the received frame is a subject of load balancing (TE pattern=1).

(S22) From the given layer-2 source address and layer-2 destination address, the TE unit 12 calculates a certain value for determining which virtual sending port to use, with reference to the load balancing table T7.

(S23) The path data manager 13 extracts information from the L1 mapping table T6, which gives a particular MPLS-side physical port that is associated with the virtual sending port determined in step S22.

(S24) The labeling unit 14 adds to the frame an L1 label relevant to the MPLS-side physical port and sends out the resulting MPLS frame F to the associated L1 LSP, thus delivering the frame over the MPLS network 5.

Figure 15:
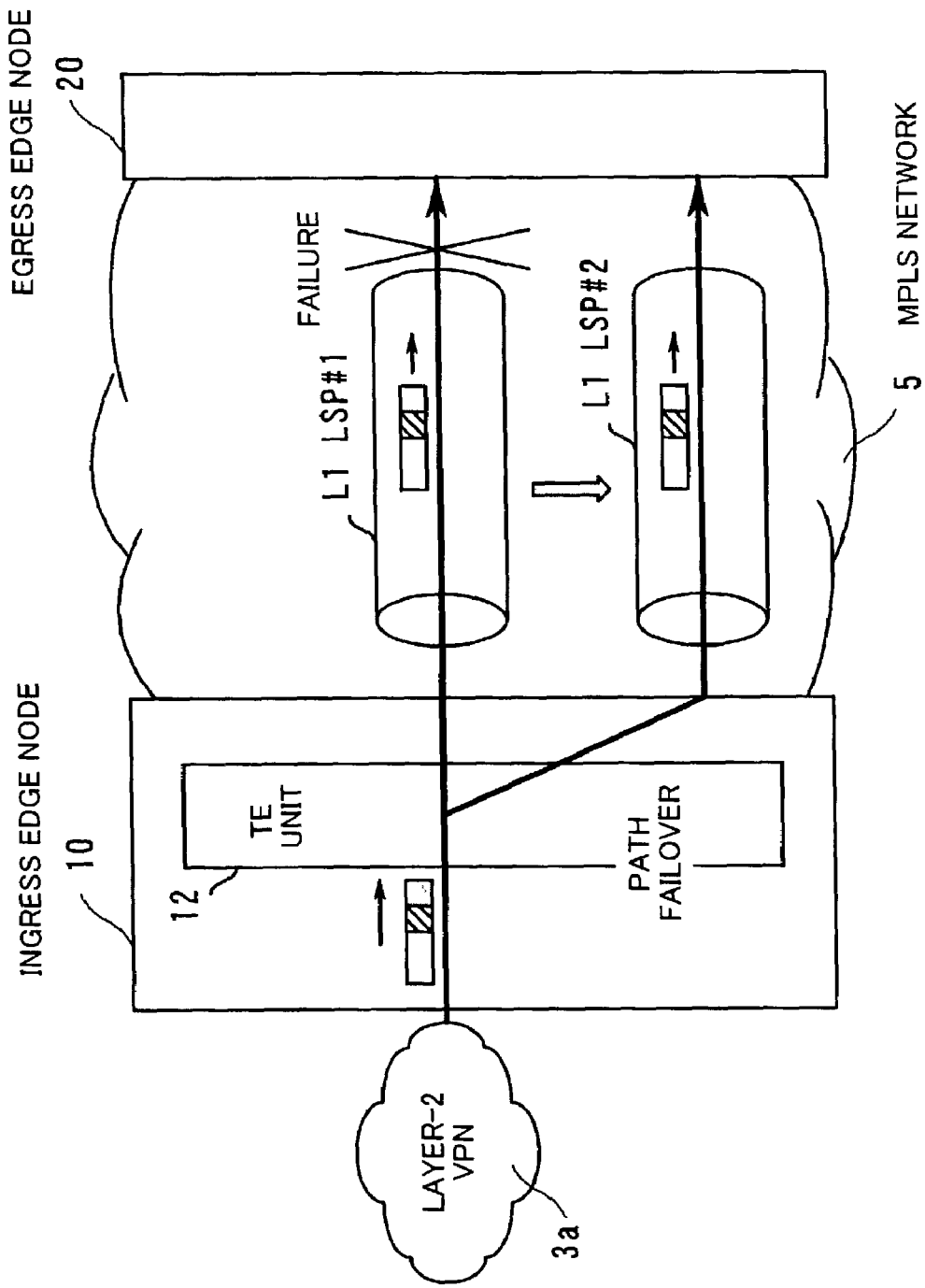
FIG. 15 shows the concept of path failover.

Referring next to FIGS. 15 to 18, we will describe the path failover function (TE pattern=2). FIG. 15 depicts the concept of this function, where only the TE unit 12 is shown in the ingress edge node 10 for simplicity purposes.

Consider that the ingress edge node 10 is receiving frames from its local layer-2 VPN 3*a*. The TE unit 12 examines whether to subject this frame traffic to any of the traffic engineering processes it provides. When the TE pattern is set to "2," the TE unit 12 would activate its path failover function in case of failure in L1 LSP#1, redirecting the frames to L1 LSP#2 which is in a normal condition.

Figure 16:
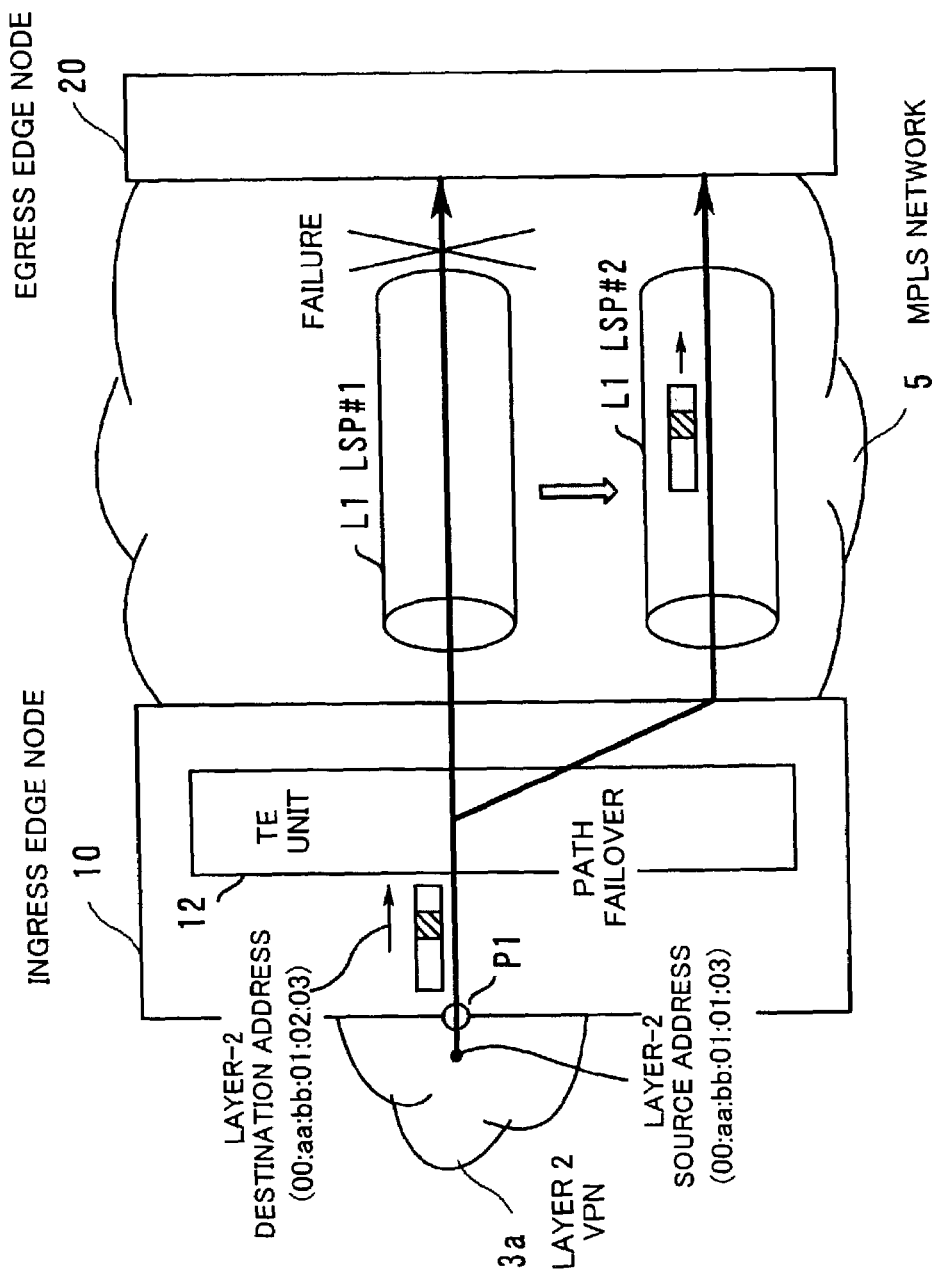

FIGS. 16 and 17 explain the path failover function in greater detail. The TE unit 12 consults the layer-2 flow condition table T5, based on the layer-2 source address (00:aa:bb:01:01:03) and layer-2 destination address (00:aa:bb:01:02:03). This reveals that the received frame is a subject of path failover processing (TE pattern=2). The TE unit 12 then scans a failover table T8 in an attempt to find an entry that records the logical sending port (L2-12) and its current path status is normal. If such an entry is found, the TE unit 12 extracts the value of its virtual sending port field, which is "101" in the example of FIG. 17. In this way, the TE unit 12 determines an alternative path to detour the failure.

Based on the above results, the path data manager 13 finds an MPLS-side physical port that is associated with the virtual sending port "101" determined above, consulting an L1 mapping table T6 (not shown). The labeling unit 14 then adds a relevant L1 label to the frame and sends out the resulting MPLS frame F via the MPLS-side physical port and its corresponding L1 LSP (L1 LSP#2 in FIG. 16), thus delivering the frame over the MPLS network 5.

Figure 18:
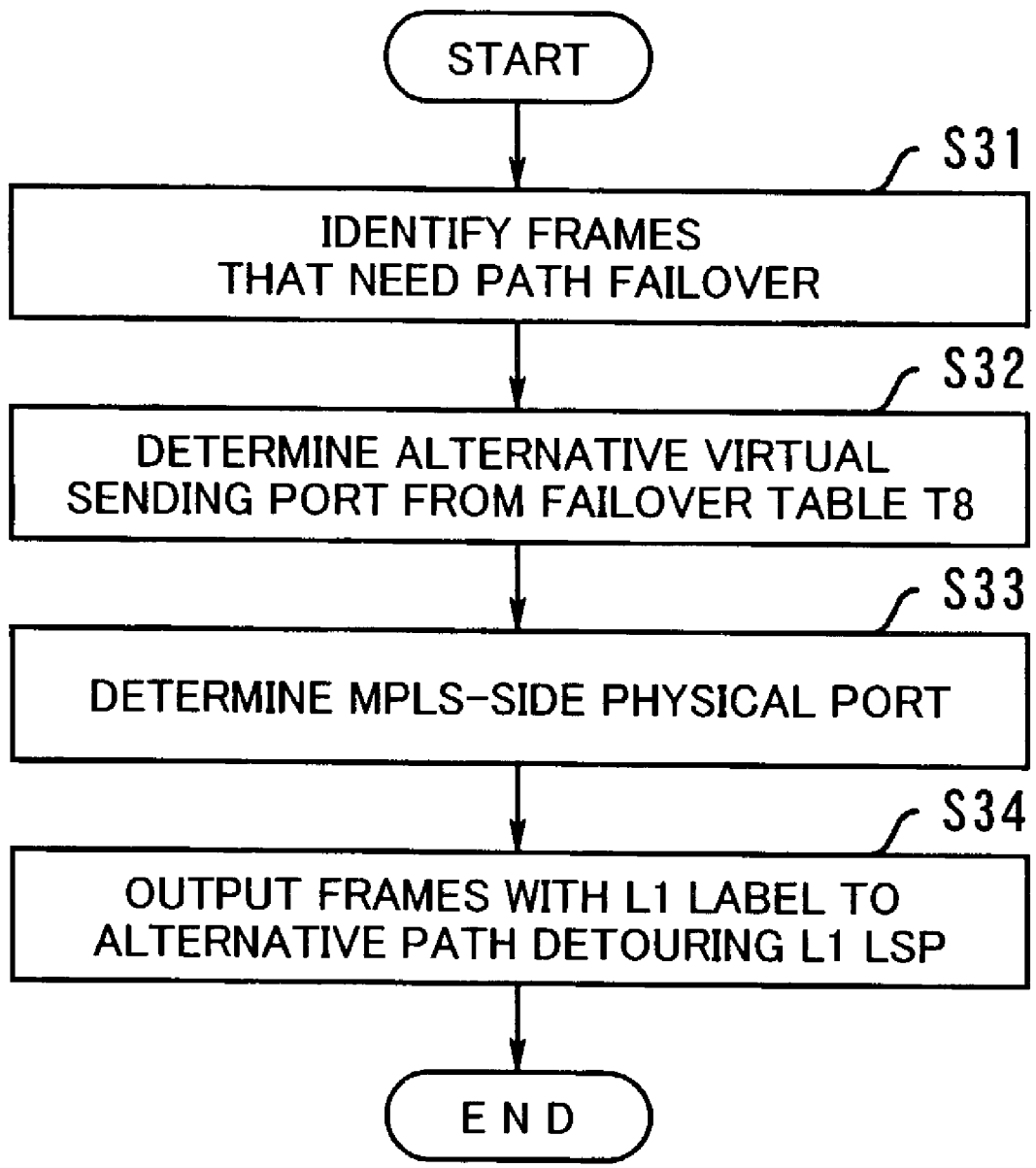
FIG. 18 is a flowchart of a series of processing tasks, from path failover operation to output of MPLS frames.

FIG. 18 is a flowchart showing a series of processing tasks, from path failover operation to output of an MPLS frame F, which includes the following steps:

(S31) The TE unit 12 consults the layer-2 flow condition table T5, based on a given layer-2 source address and layer-2 destination address. This reveals that the received frame is a subject of path failover (TE pattern=2).

(S32) The TE unit 12 then scans a failover table T8 in an attempt to find an entry that records the logical sending port in question. If such an entry is found, and if it indicates the presence of a port functioning normally, the TE unit 12 extracts the value of its virtual sending port field.

(S33) The path data manager 13 extracts information from the L1 mapping table T6, which gives a particular MPLS-side physical port that is associated with the virtual sending port determined in step S32.

(S34) The labeling unit 14 adds to the frame an L1 label relevant to the MPLS-side physical port and sends out the resulting MPLS frame F to the associated L1 LSP, thus delivering the frame over the MPLS network 5.

Figure 19:
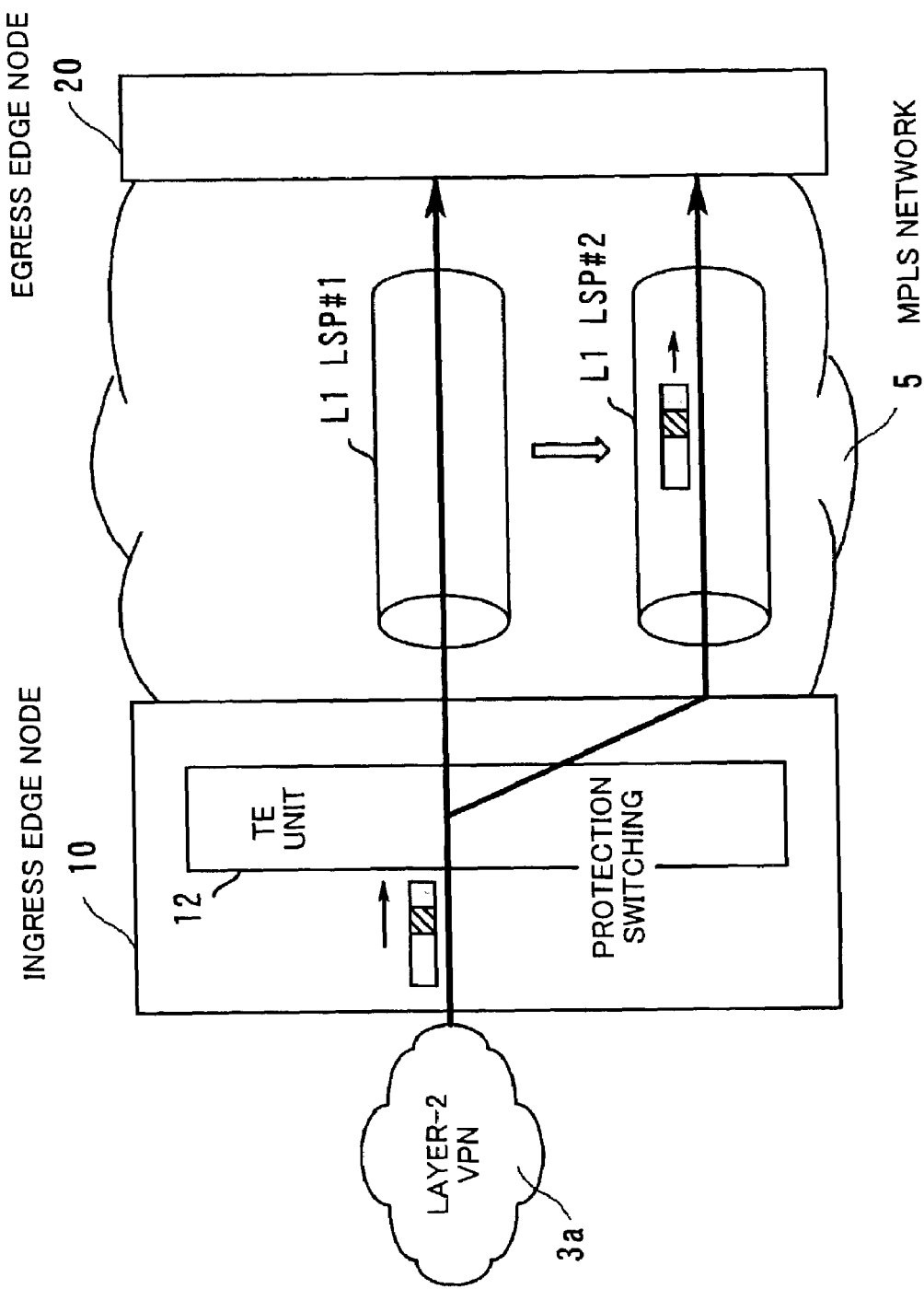
FIG. 19 shows the concept of protection switching.

Referring next to FIGS. 19 to 22, we will describe the protection switching function (TE pattern=3). FIG. 19 depicts the concept of this function, where only the TE unit 12 is shown in the ingress edge node 10 for simplicity purposes.

Consider that the ingress edge node 10 is receiving frames from its local layer-2 VPN 3*a*. The TE unit 12 examines whether to subject this frame traffic to any of the traffic engineering processes it provides. When the TE pattern is set to "3," the TE unit 12 would activate its protection switching function to redirect the frames to the protection path L1 LSP#2 in case of failure in the working path L1 LSP#1.

Figure 20:
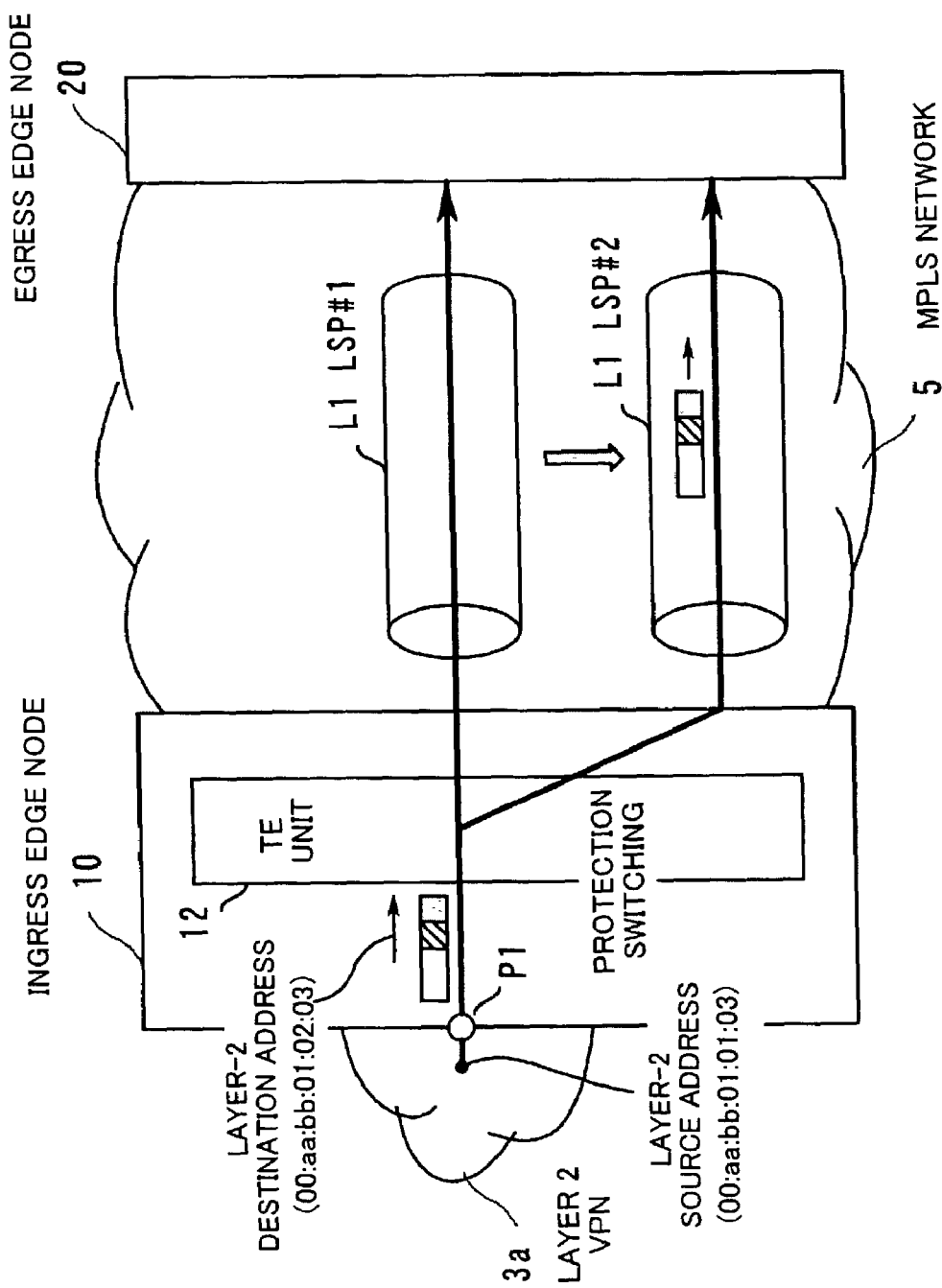
FIGS. 20 and 21 show how the system performs protection switching.
Figure 21:
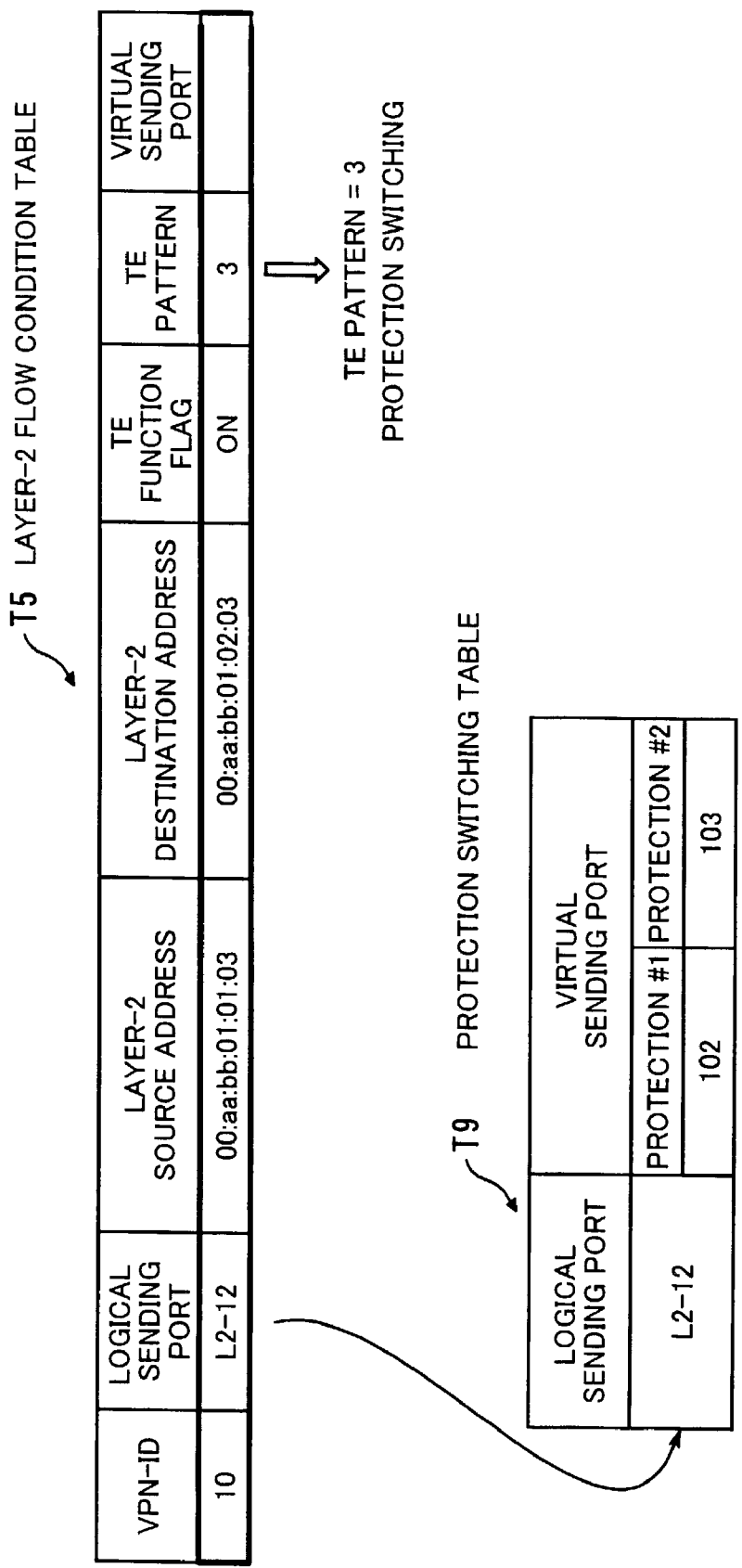

FIGS. 20 and 21 explain the protection switching function in greater detail. The TE unit 12 consults the layer-2 flow condition table T5, based on the layer-2 source address (00:aa:bb:01:01:03) and layer-2 destination address (00:aa:bb:01:02:03). This reveals that the received frame is a subject of protection switching (TE pattern=3). The TE unit 12 then scans a protection switching table T9 in an attempt to find an entry that records the logical sending port (L2-12). If such an entry is found, the TE unit 12 extracts a value from its virtual sending port field. In the present example, this field contains two values: "102" representing a first port for protection ("Protection #1") and "103" representing a second port for protection ("Protection #2"). It is assumed here that the first port "102" is chosen.

Now that the virtual sending port "102" is determined above, the path data manager 13 finds an MPLS-side physical port that is associated with it, consulting an L1 mapping table T6 (not shown). The labeling unit 14 then adds a relevant L1 label to the frame and sends out the resulting MPLS frame F via the MPLS-side physical port and its corresponding L1 LSP (L1 LSP#2 in FIG. 20), thus delivering the frame over the MPLS network 5.

Figure 22:
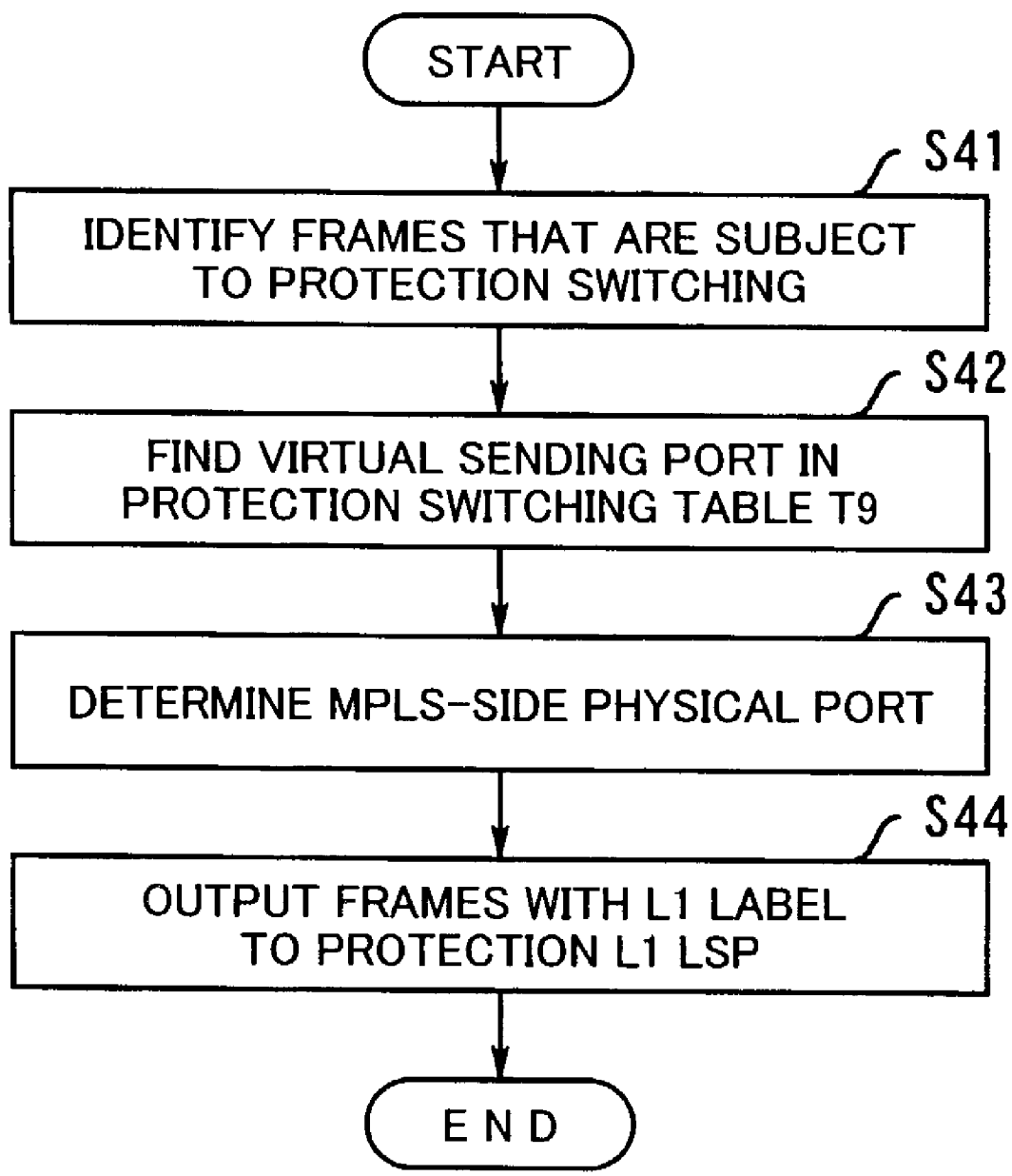
FIG. 22 is a flowchart of a series of processing tasks, from protection switching operation to output of MPLS frames.

FIG. 22 is a flowchart of a series of processing tasks, from protection switching operation to output of MPLS frames, which includes the following steps:

(S41) The TE unit 12 consults the layer-2 flow condition table T5, based on the layer-2 source and destination addresses. This reveals that the received frame is a subject of protection switching (TE pattern=3).

(S42) The TE unit 12 then scans a protection switching table T9 in an attempt to find an entry that records a given logical sending port. If such an entry is found, the TE unit 12 extracts an alternative port number reserved for protection switching.

(S43) The path data manager 13 extracts information from the L1 mapping table T6, which gives a particular MPLS-side physical port that is associated with the virtual sending port determined in step S42.

(S44) The labeling unit 14 adds to the frame an L1 label relevant to the MPLS-side physical port and sends out the resulting MPLS frame F to the associated L1 LSP, thus delivering the frame over the MPLS network 5.

Figure 23:
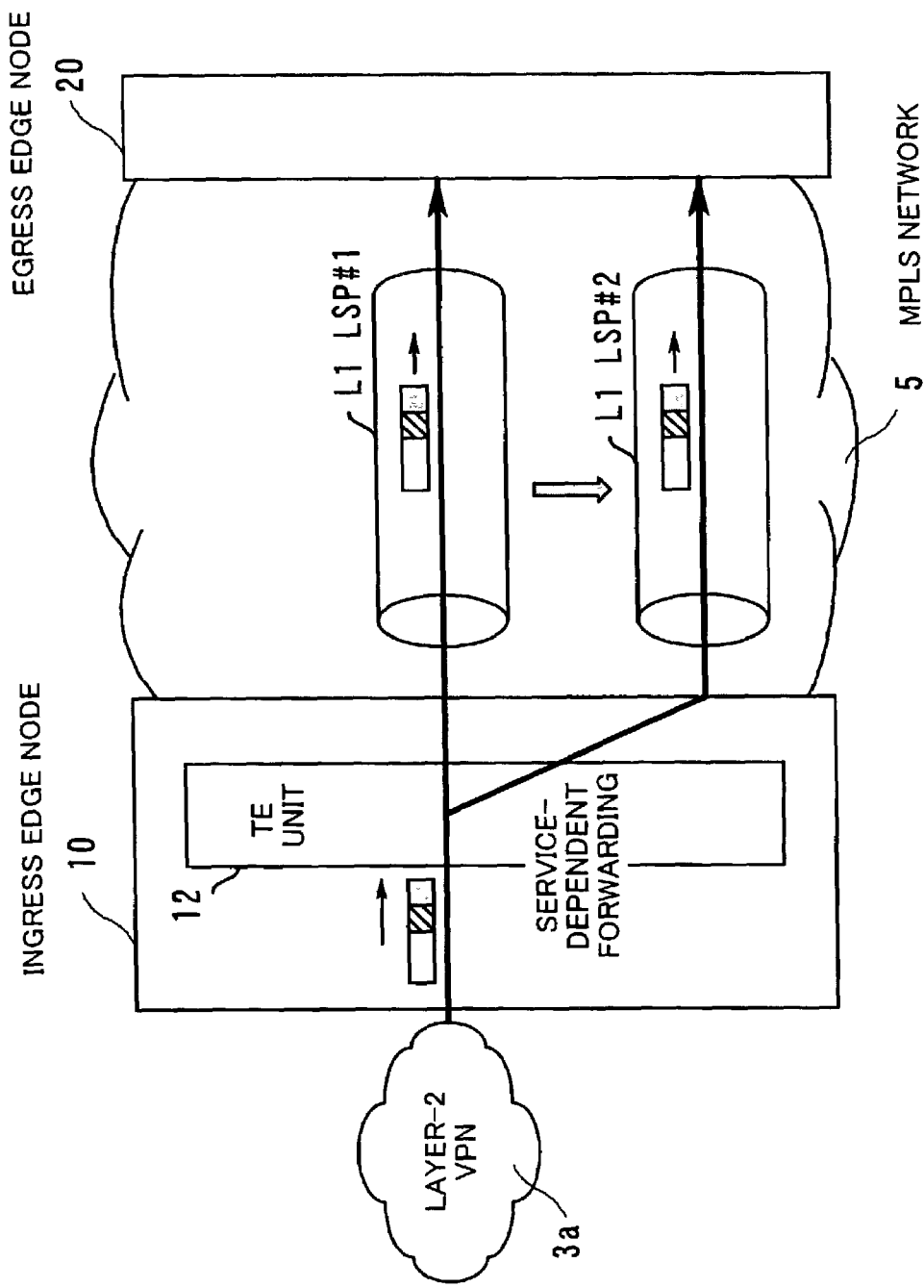
FIGS. 23 to 25 shows the concept of a service-dependent forwarding.

Referring next to FIGS. 23 to 26, we will describe the service-dependent forwarding function (TE pattern=4). FIG. 23 depicts the concept of this function, where only the TE unit 12 is shown in the ingress edge node 10 for simplicity purposes.

Consider that the ingress edge node 10 is receiving frames from its local layer-2 VPN 3*a*. The TE unit 12 examines whether to subject this frame traffic to any of the traffic engineering processes it provides. When the TE pattern is set to "4," the TE unit 12 activates its service-dependent forwarding function. The frames are thus redirected to either L1 LSP#1 or L1 LSP#2, depending on for which service they are intended (e.g., L1 LSP#1 for best-effort service, and L1 LSP#2 for bandwidth guaranteed service).

Figure 24:
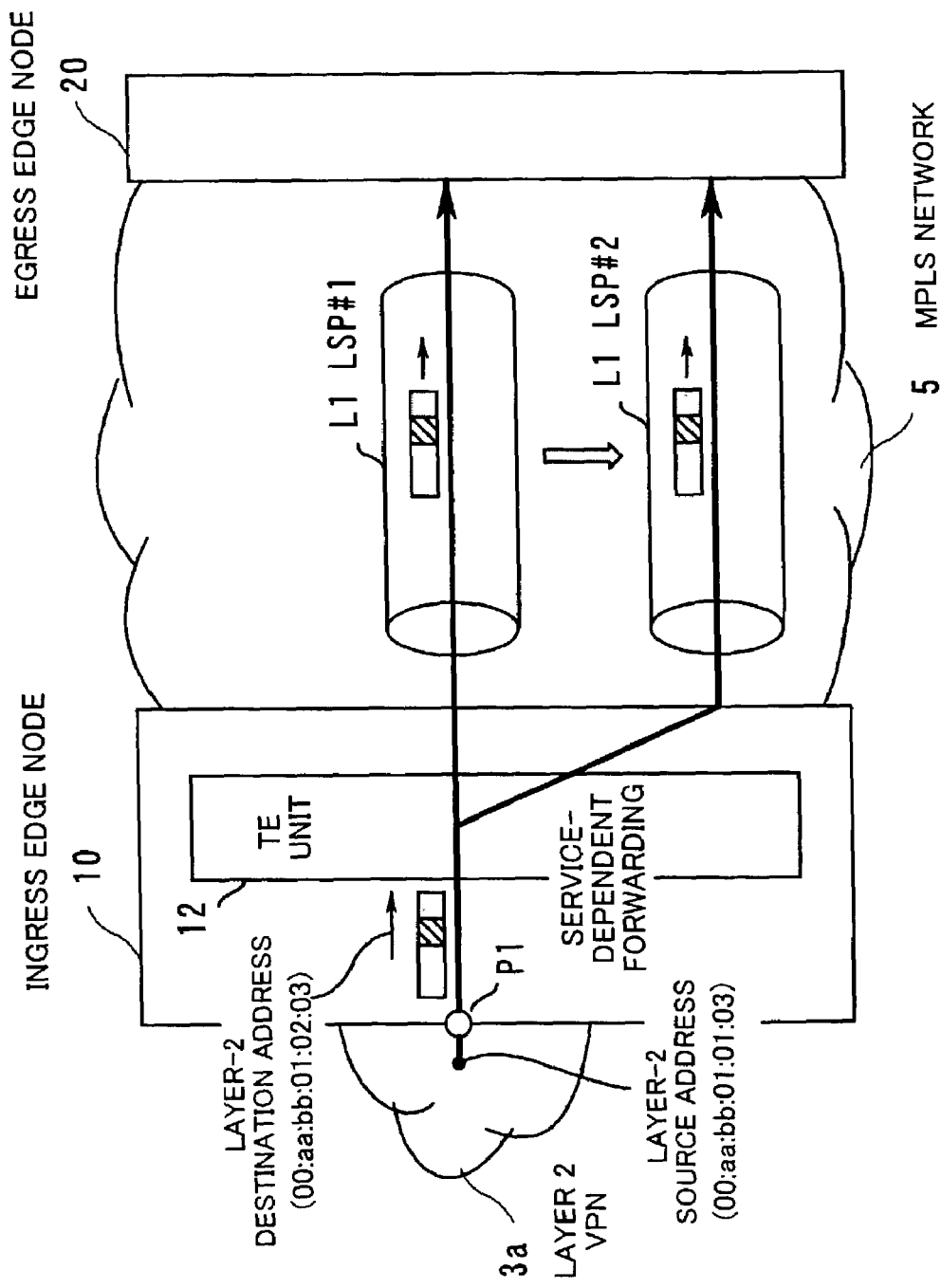
Figure 25:
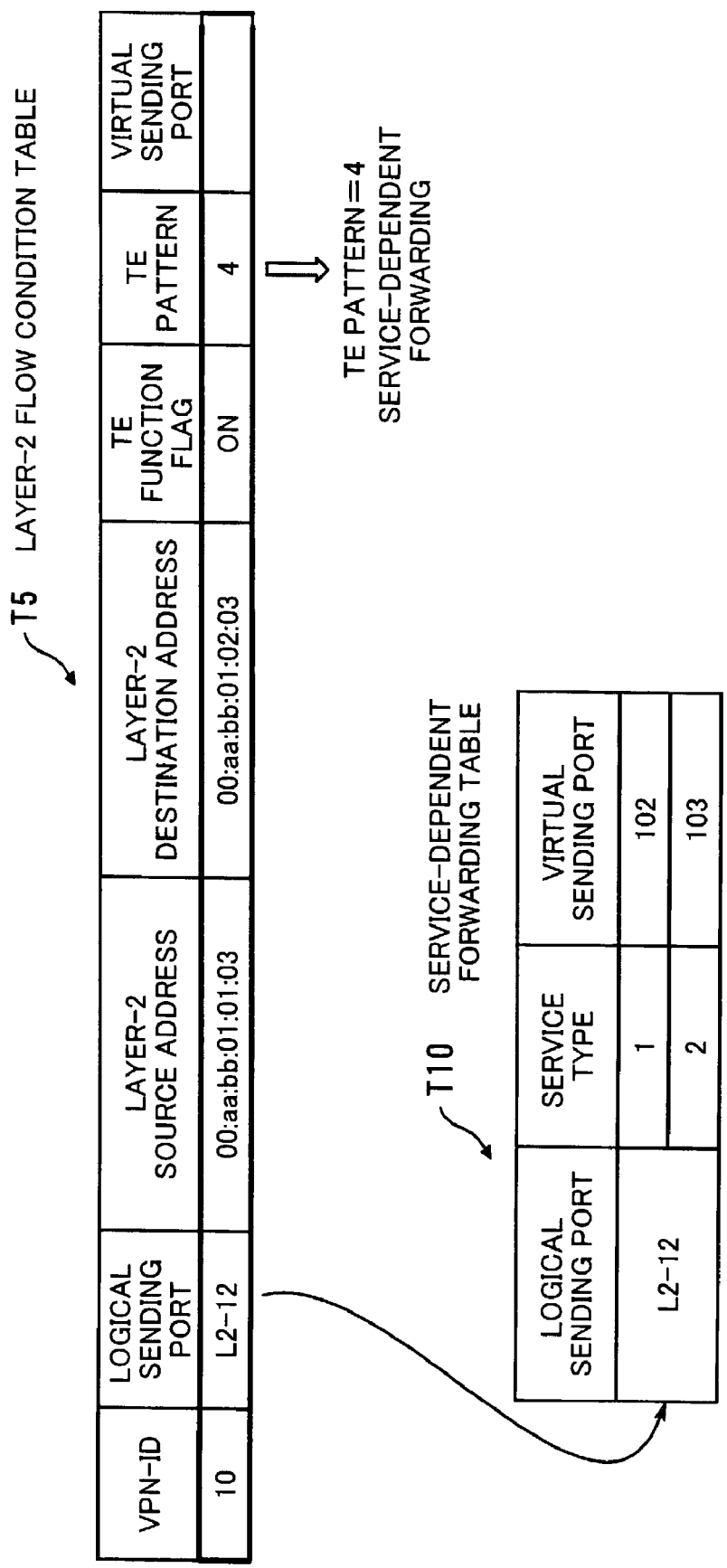

FIGS. 24 and 25 explain the service-dependent forwarding function in greater detail. The TE unit 12 consults the layer-2 flow condition table T5, based on the layer-2 source address (00:aa:bb:01:01:03) and layer-2 destination address (00:aa:bb:01:02:03). This reveals that the received frame is a subject of service-dependent forwarding (TE pattern=4).

The TE unit 12 then scans a service-dependent forwarding table T10 in an attempt to find an entry that records the logical sending port (L2-12). From the entry that is found, the TE unit 12 chooses a particular virtual sending port associated with the given service type. In the present example, the virtual sending port field contains two values: "102" for a first service type and "103" for a second service type.

Suppose, for example, that the virtual sending port "102" is selected. The path data manager 13 then finds an MPLS-side physical port that is associated with the virtual sending port "102," consulting an L1 mapping table T6 (not shown). The labeling unit 14 then adds to the frame an L1 label relevant to the MPLS-side physical port and sends out the resulting MPLS frame F to the associated L1 LSP, thus delivering the frame over the MPLS network 5.

Figure 26:
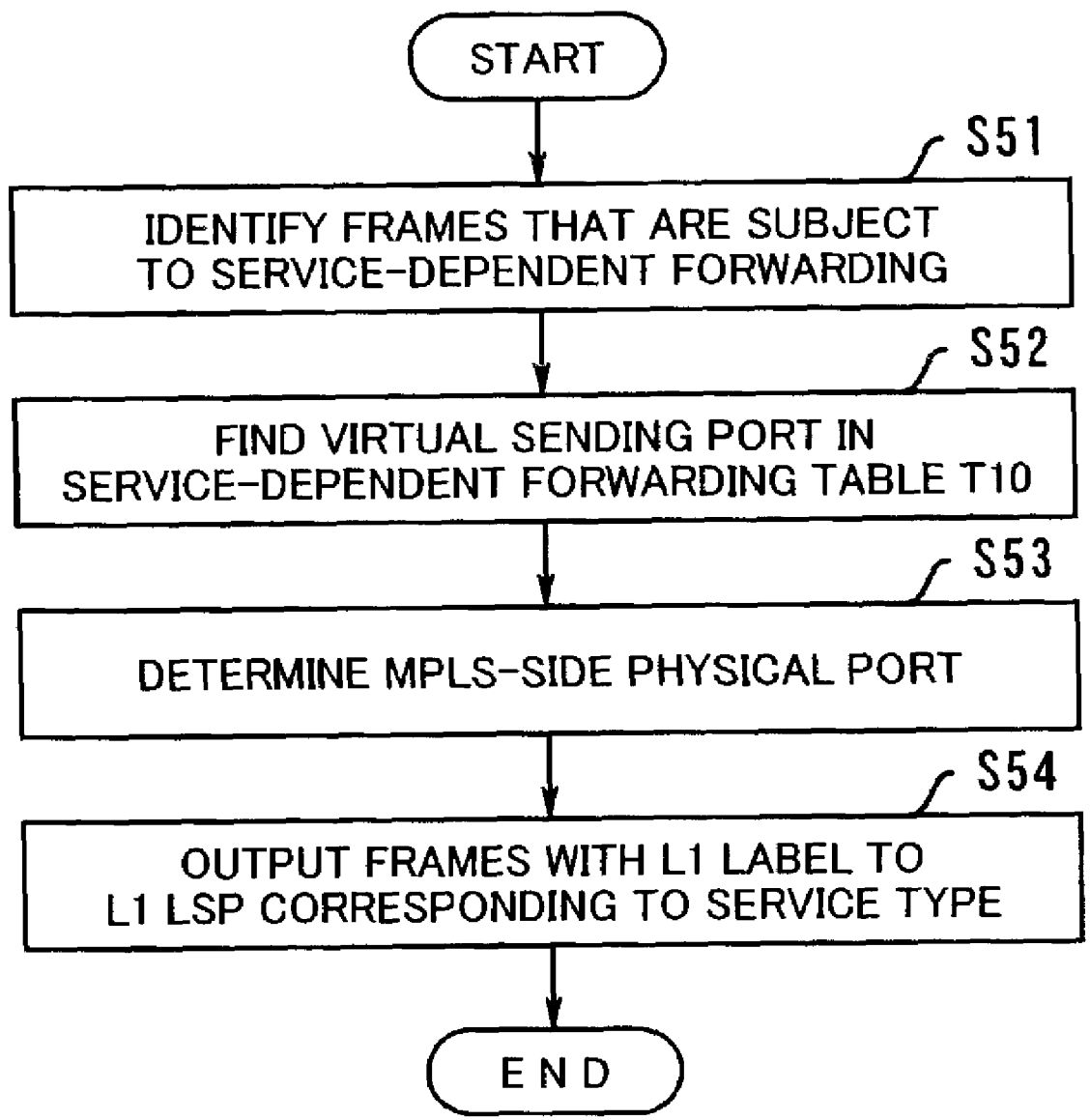
FIG. 26 is a flowchart of a series of processing tasks, from service-dependent forwarding operation to output of MPLS frames.
Figure 27:
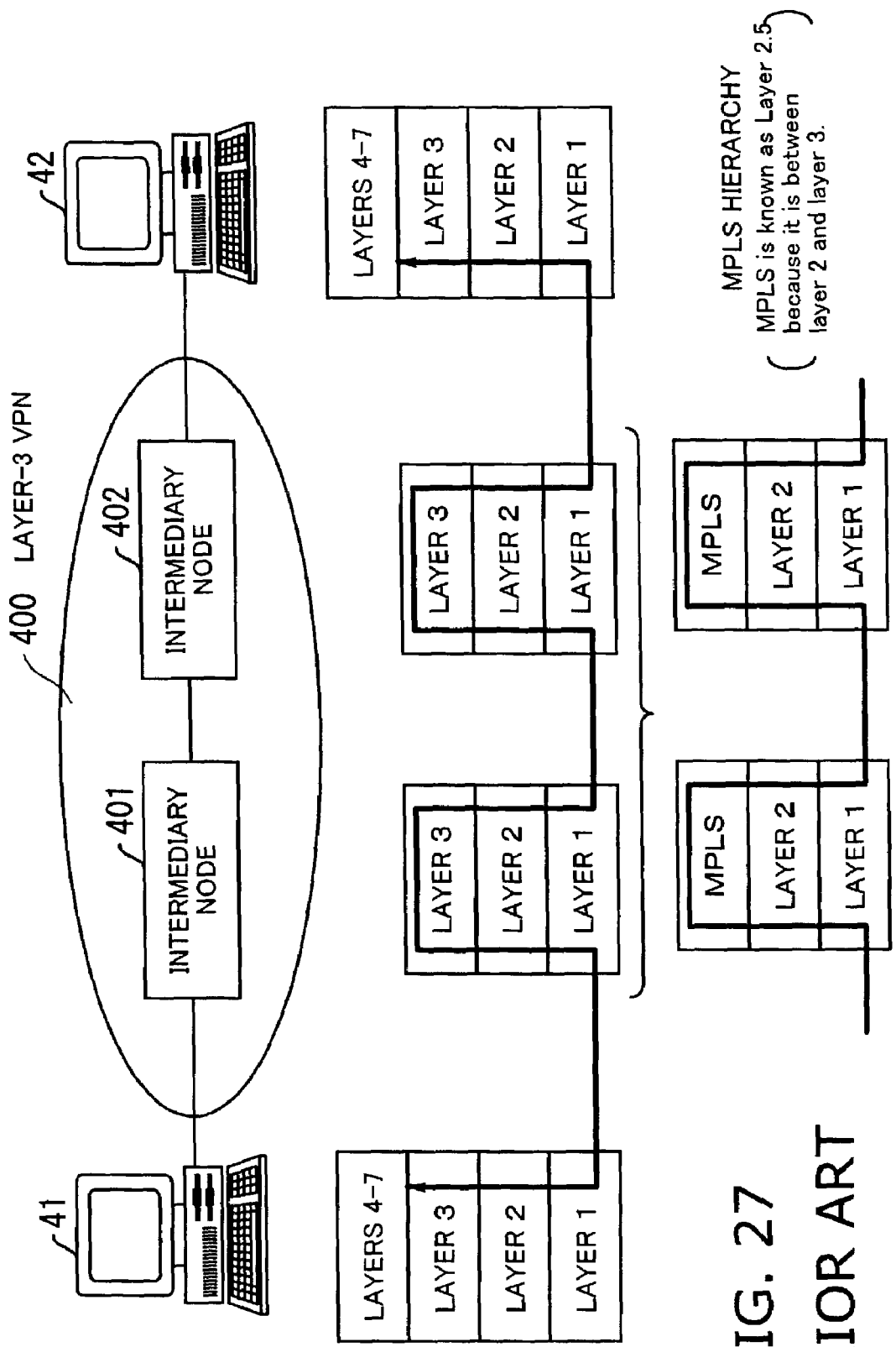
FIG. 27 shows the structure of a layer-3 based VPN.
Figure 28:
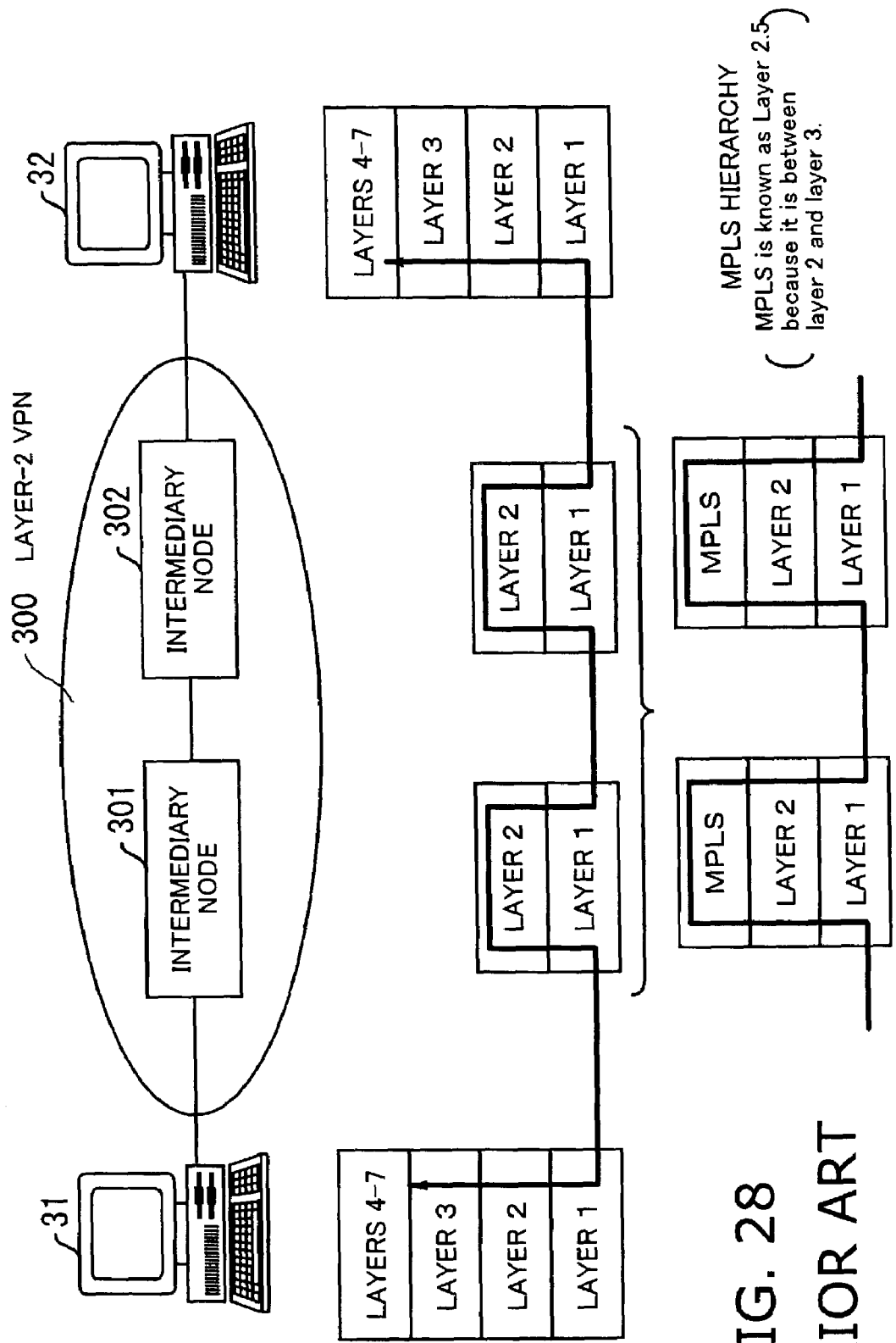
FIG. 28 shows the structure of a layer-2 based VPN.

FIG. 26 is a flowchart showing a series of processing tasks, from service-dependent forwarding operation to output of MPLS frames, which includes the following steps:

(S51) The TE unit 12 consults the layer-2 flow condition table T5, based on the layer-2 source and destination addresses. This reveals that the received frame is a subject of service-dependent forwarding (TE pattern=4).

(S52) The TE unit 12 then scans the service-dependent forwarding table T10 in an attempt to find an entry that records the given logical sending port, and from that table entry, it chooses a particular virtual sending port associated with the given service type.

(S53) The path data manager 13 consults the L1 mapping table T6 to find an MPLS-side physical port that is associated with the virtual sending port determined in step S52.

(S54) The labeling unit 14 adds to the frame an L1 label relevant to the MPLS-side physical port and sends out the resulting MPLS frame F to the service-dependent L1 LSP, thus delivering the frame over the MPLS network 5.

As seen from the above explanation, the present invention enables a single MPLS network 5 to carry the traffic of both layer-2 and layer-3 VPNs in a mixed way. The proposed system also provides traffic engineering services in layer-2 communication. This feature of the present invention introduces more flexibility into network management operations, besides promoting improvement of network service quality.

According to the present invention, the communications system controls the flow of frames by using the concept of "physical ports," "logical sending ports," and "virtual sending ports." "Physical ports" refer to physical interfaces to which the transmission cables are attached. A physical port accommodates a plurality of communication channels, each of which is called a "logical sending port." Normally, these two kinds of ports suffice for the systems without traffic engineering functions because there is one-to-one static correspondence between physical ports and logical sending ports (i.e., LSPs are uniquely identified). However, in the case where the traffic engineering functions are supported, one given logical sending port may be either of a plurality of physical ports (or a plurality of LSPs). It is therefore necessary for the system to determine which physical port (or which LSP) to use, in an indirect fashion.

The concept of "virtual sending port" is introduced to solve the above issue. That is, an appropriate virtual sending port is chosen in the course of traffic engineering operations for each frame, which is then mapped onto a specific physical port. The present invention actually uses virtual sending ports as a standard way of designating communication ports, regardless of the use of traffic engineering functions.

As seen from the above discussions, the present invention enables a single edge node to process both layer-2 VPN traffic and layer-3 VPN traffic, while connecting remote user networks through an existing MPLS transport. With this feature of the proposed system, we can set up a layer-2 and layer-3 VPNs, not separately, but in an integrated way. The present invention thus brings cost-savings in network construction, which would be a tremendous amount particularly when it is applied to a large carrier network including hundreds of nodes. Also, core nodes in an MPLS network are allowed to link with conventional devices, meaning that the flexibility is preserved in this aspect.

Another advantage of the proposed system is that traffic engineering functions are available not only in layer-3 VPNs, but also in layer-2 VPNs. This feature provides users with improved services in layer-2 VPNs, including load balancing, path failover, and differentiated traffic control.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communications system which provides virtual private network (VPN) services for a layer-2 VPN and a layer-3 VPN through an intra-network transport path between network nodes, wherein the layer-2 VPN establishes a layer-2 VPN path for end-to-end communication, while the layer-3 VPN establishes a layer-3 VPN path for end-to-end communication, the communications system comprising:

(a) a sending device which permits the layer-2 VPN path and layer-3 VPN path to be established within the intra-network transport path, so as to deliver frames from a first part of the layer-2 and layer-3 VPNs to a second part of the layer-2 and layer-3 VPNs through the intra-network transport path, the sending device comprising:
  a path data manager which sets and manages path data describing configuration of the intra-network transport path, and
  a labeling unit which adds an intra-network transport label to each of the frames for transport over the intra-network transport path, based on the path data, the frames having been attached a VPN label for transport over the layer-2 or layer-3 VPN path; and
(b) a receiving device which receives the frames from the sending device via the intra-network transport path, comprising:
  a frame discrimination value setting unit which gives a frame discrimination value that is used to determine whether each received frame is a layer-2 VPN frame or a layer-3 VPN frame, and
  a redirection processor which redirects each received frame to the second part of the layer-2 VPN or the second part of the layer-3 VPN, according to the VPN label and the frame discrimination value, wherein:
there are a plurality of intra-network transport paths between the sending device and receiving device;
a first group of frames are statically allocated one of the intra-network transport paths, and a second group of frames are dynamically allocated one of the intra-network transport paths;
in order to support both the first and second groups of frames, the sending unit manages physical ports corresponding to the individual intra-network transport paths, logical sending ports defined as channels within each physical port, and virtual sending ports indirectly associated with the physical ports; and
the sending unit determines which physical port to use for transport of the first and second groups of frames, by first selecting one of the virtual sending ports and then finding a physical port associated with the selected virtual sending port.

2. The communications system according to claim 1, further comprising a traffic engineering unit which controls traffic of the layer-2 VPN and layer-3 VPN over the intra-network transport path, including at least one of:
  a load balancing function which splits the traffic into a plurality of routes,
  a path failover function which changes delivery paths in the event of failure,
  a protection switching function which switches from a working path to a protection path in the event of failure; and
  a service-dependent forwarding function which redirects the traffic to different routes, depending on service types.

3. The communications system according to claim 1, further comprising an address forwarding processor which performs layer-2 forwarding for the layer-2 VPN and layer-3 forwarding for the layer-3 VPN.

4. The communications system according to claim 1, further comprising a broadcasting processor in the sending device, which broadcasts table setup information and routing information to user devices operating on a particular VPN,
  wherein the network devices includes local user devices connected to local ports of the sending device and remote user devices connected to ports of other network nodes, and
  wherein the broadcasting processor supplies the table setup information and routing information to the local user devices via the local ports of the sending device, as well as to the labeling unit for delivery to the remote user devices over the intra-network transport path.

5. A sending device which provides virtual private network (VPN) services for a layer-2 VPN and a layer-3 VPN through an intra-network transport path between network nodes, wherein the layer-2 VPN establishes a layer-2 VPN path for end-to-end communication, while the layer-3 VPN establishes a layer-3 VPN path for end-to-end communication, the sending device comprising:
  a path data manager which sets and manages path data describing configuration of the intra-network transport path; and
  a labeling unit which adds an intra-network transport label to each frame for transport over the intra-network transport path, based on the path data, the frames having been attached a VPN label for transport over the layer-2 or layer-3 VPN path, wherein:
there are a plurality of intra-network transport paths;
a first group of frames are statically allocated one of the intra-network transport paths, and a second group of frames are dynamically allocated one of the intra-network transport paths;
in order to support both the first and second groups of frames, the sending unit manages physical ports corresponding to the individual intra-network transport paths, logical sending ports defined as channels within each physical port, and virtual sending ports indirectly associated with the physical ports; and
the sending unit determines which physical port to use for transport of the first and second groups of frames, by first selecting one of the virtual sending ports and then finding a physical port associated with the selected virtual sending port.

6. The sending device according to claim 5, further comprising a traffic engineering unit which controls traffic of the layer-2 VPN and layer-3 VPN over the intra-network transport path, including at least one of:
  a load balancing function which splits the traffic into a plurality of routes,
  a path failover function which changes delivery paths in the event of failure,
  a protection switching function which switches from a working path to a protection path in the event of failure; and
  a service-dependent forwarding function which redirects the traffic to different routes, depending on service types.

7. The sending device according to claim 5, further comprising an address forwarding processor which performs layer-2 forwarding for the layer-2 VPN and layer-3 forwarding for the layer-3 VPN.

8. The sending device according to claim 5, further comprising a broadcasting processor in the sending device, which broadcasts table setup information and routing information to user devices operating on a particular VPN,
  wherein the network devices includes local user devices connected to local ports of the sending device and remote user devices connected to ports of other network nodes, and wherein the broadcasting processor supplies the table setup information and routing information to the local user devices via the local ports of the sending device, as well as to the labeling unit for delivery to the remote user devices over the intra-network transport path.

9. A communications system which provides multi-protocol label-switched virtual private network (MPLS-VPN) services for a layer-2 VPN and a layer-3 VPN through a level-1 label-switched path (L1 LSP) that is established between network nodes for transport of MPLS frames having an L1 label as an outer label thereof, wherein the layer-2 VPN establishes a first level-2 label-switched path (L2 LSP) for end-to-end communication, while the layer-3 VPN establishes a second L2 LSP for end-to-end communication, the communications system comprising:
  (a) an ingress edge node which permits the first and second L2 LSPs to be established both within the L1 LSP, so as to deliver given frames from a first part of the layer-2 and layer-3 VPNs to a second part of the layer-2 and layer-3 the L1 LSP, the ingress edge node comprising:
    a path data manager which sets and manages path data describing configuration of the L1 LSP, and
    a labeling unit which adds the L1 label to each given frame for transport over the L1 LSP, based on the path data, the given frame having been attached an L2 label as an inner label for transport over the first or second L2 LSP; and
  (b) an egress edge node which receives the frames from the ingress edge node via the L1 LSP, comprising:
    a frame discrimination value setting unit which gives a frame discrimination value that is used to determine whether each received frame is a layer-2 VPN frame or a layer-3 VPN frame, and
    a redirection processor which redirects each received frame to the second part of the layer-2 VPN or the second part of the layer-3 VPN, according to the L2 label and the frame discrimination value, wherein:
  there are a plurality of L1 LSPs between the ingress edge node and egress edge node;
  a first group of frames are statically allocated one of the L1 LSPs, and a second group of frames are dynamically allocated one of the L1 LSPs;
  in order to support both the first and second groups of frames, the sending unit manages physical ports corresponding to the individual L1 LSPs, logical sending ports defined as channels within each physical port, and virtual sending ports indirectly associated with the physical ports; and
  the sending unit determines which physical port to use for transport of the first and second groups of frames, by first selecting one of the virtual sending ports and then finding a physical port associated with the selected virtual sending port.

10. The communications system according to claim 9, further comprising a traffic engineering unit which controls traffic of the layer-2 VPN and layer-3 VPN over the L1 LSP, including at least one of:
  a load balancing function which splits the traffic into a plurality of routes,
  a path failover function which changes delivery paths in the event of failure,
  a protection switching function which switches from a working path to a protection path in the event of failure; and
  a service-dependent forwarding function which redirects the traffic to different routes, depending on service types.

11. The communications system according to claim 9, further comprising an address forwarding processor which performs layer-2 forwarding for the layer-2 VPN and layer-3 forwarding for the layer-3 VPN.

12. The communications system according to claim 9, further comprising a broadcasting processor in the ingress edge node, which broadcasts table setup information and routing information to user devices operating on a particular VPN,
  wherein the network devices includes local user devices connected to local ports of the ingress edge node and remote user devices connected to ports of other network nodes, and
  wherein the broadcasting processor supplies the table setup information and routing information to the local user devices via the local ports of the ingress edge node, as well as to the labeling unit for delivery to the remote user devices over the L1 LSP.

* * * * *